United States Patent
Shioda

(10) Patent No.: US 8,743,259 B2
(45) Date of Patent: Jun. 3, 2014

(54) INFORMATION DISPLAYING APPARATUS

(75) Inventor: Takanori Shioda, Chofu (JP)

(73) Assignee: Nikon Corporation, Tokyo (JP)

( * ) Notice: Subject to any disclaimer, the term of this patent is extended or adjusted under 35 U.S.C. 154(b) by 579 days.

(21) Appl. No.: 12/318,489

(22) Filed: Dec. 30, 2008

(65) Prior Publication Data

US 2009/0180004 A1 Jul. 16, 2009

(30) Foreign Application Priority Data

Jan. 10, 2008 (JP) .................. 2008-002902

(51) Int. Cl.
*H04N 5/222* (2006.01)

(52) U.S. Cl.
USPC ................. 348/333.02; 348/333.12

(58) Field of Classification Search
CPC ..................................... H04N 5/222
USPC ............ 348/333.01, 333.02, 333.03, 333.05, 348/333.11, 333.12; 382/115, 118; 396/281–296
See application file for complete search history.

(56) References Cited

U.S. PATENT DOCUMENTS

| | | | |
|---|---|---|---|
| 7,643,658 B2 * | 1/2010 | Kilner et al. .................. | 382/118 |
| 2002/0171744 A1 | 11/2002 | Kaku | |
| 2004/0252913 A1 | 12/2004 | Ahn | |
| 2005/0234324 A1 * | 10/2005 | Sugimoto ..................... | 600/407 |
| 2006/0279528 A1 | 12/2006 | Schobben et al. | |
| 2008/0152197 A1 * | 6/2008 | Kawada ........................ | 382/115 |
| 2008/0152199 A1 * | 6/2008 | Oijer ............................. | 382/118 |
| 2009/0087016 A1 * | 4/2009 | Berestov et al. .............. | 382/100 |
| 2009/0129636 A1 * | 5/2009 | Mei et al. ...................... | 382/118 |

FOREIGN PATENT DOCUMENTS

| | | | | |
|---|---|---|---|---|
| CN | 1677441 A | 10/2005 | | |
| CN | 101095149 A | 12/2007 | | |
| CN | 101207775 A | 6/2008 | | |
| JP | A-2002-344725 | 11/2002 | | |
| JP | 2003-186462 | * 7/2003 | ............... | G09G 5/00 |
| JP | A-2003-186462 | 7/2003 | | |
| JP | A-2004-110453 | 4/2004 | | |
| JP | A-2004-286614 | 10/2004 | | |
| JP | A-2005-004210 | 1/2005 | | |

(Continued)

OTHER PUBLICATIONS

Oct. 31, 2012 Office Action issued in Chinese Application No. 200910002913.6 (with English translation).

(Continued)

*Primary Examiner* — Twyler Haskins
*Assistant Examiner* — Akshay Trehan
(74) *Attorney, Agent, or Firm* — Oliff PLC

(57) ABSTRACT

An information displaying apparatus includes: a memory control unit that stores information to a storage medium, and outputs the information from the storage medium; a display that displays the information output from the storage medium in a predetermined display form on a screen of the display; an image-capturing unit that captures an image of an observer in a state to observe the display and outputs an image signal; a facial image detection unit that detects an inclination of a facial image of the observer based on the image signal; and a display form change unit that changes the display form of the information to be displayed on the screen. The display form change unit changes the display form so that the information to be displayed on the screen rotates by a predetermined rotation angle based on the inclination of the facial image detected by the facial image detection unit.

15 Claims, 40 Drawing Sheets

(56) References Cited

FOREIGN PATENT DOCUMENTS

| | | | | |
|---|---|---|---|---|
| JP | A-2005-26933 | 1/2005 | | |
| JP | A-2005-202208 | 7/2005 | | |
| JP | A-2005-236883 | 9/2005 | | |
| JP | A-2005-260666 | 9/2005 | | |
| JP | A-2005-260870 | 9/2005 | | |
| JP | 2006-023953 | * | 1/2006 | ............ G06F 3/048 |
| JP | A-2006-23953 | 1/2006 | | |
| JP | A-2006-064893 | 3/2006 | | |
| JP | A-2006-211245 | 8/2006 | | |
| JP | A-2006-238362 | 9/2006 | | |
| JP | A-2006-522397 | 9/2006 | | |
| JP | A-2006-287386 | 10/2006 | | |
| JP | A-2007-67782 | 3/2007 | | |
| JP | A-2007-264124 | 10/2007 | | |
| JP | A-2007-280029 | 10/2007 | | |
| WO | WO 2007/111383 A1 | 10/2007 | | |
| WO | WO 2007/147449 A1 | 12/2007 | | |
| WO | WO 2008/007703 A1 | 1/2008 | | |

OTHER PUBLICATIONS

Apr. 28, 2012 Office Action issued in Chinese Application No. 200910002913.6 (with English translation).

Jun. 5, 2012 Office Action issued in Japanese Patent Application No. 2008-002902 (with translation).

Mar. 12, 2013 Office Action issued in Japanese Patent Application No. 2008-002902 (with translation).

* cited by examiner

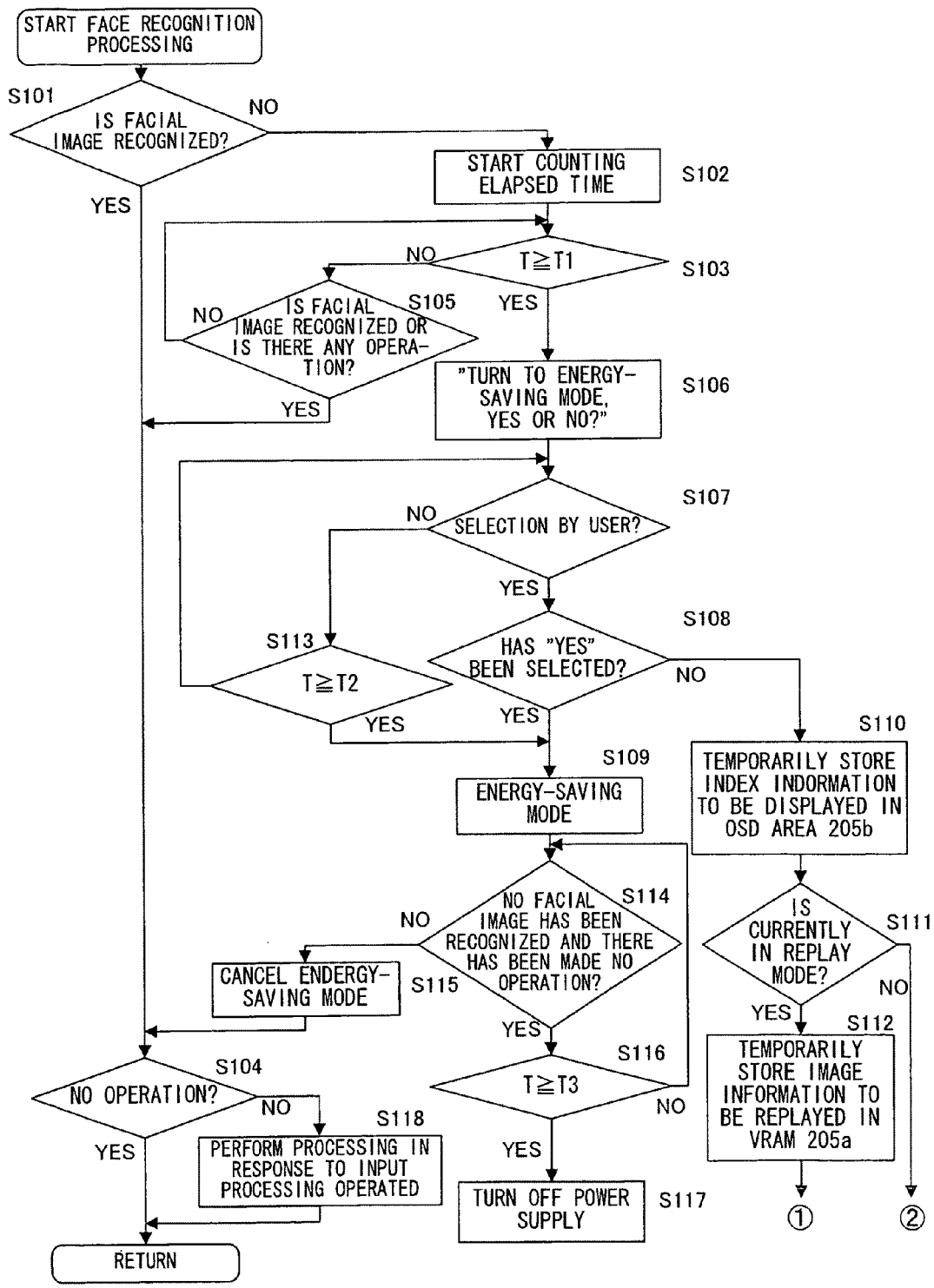

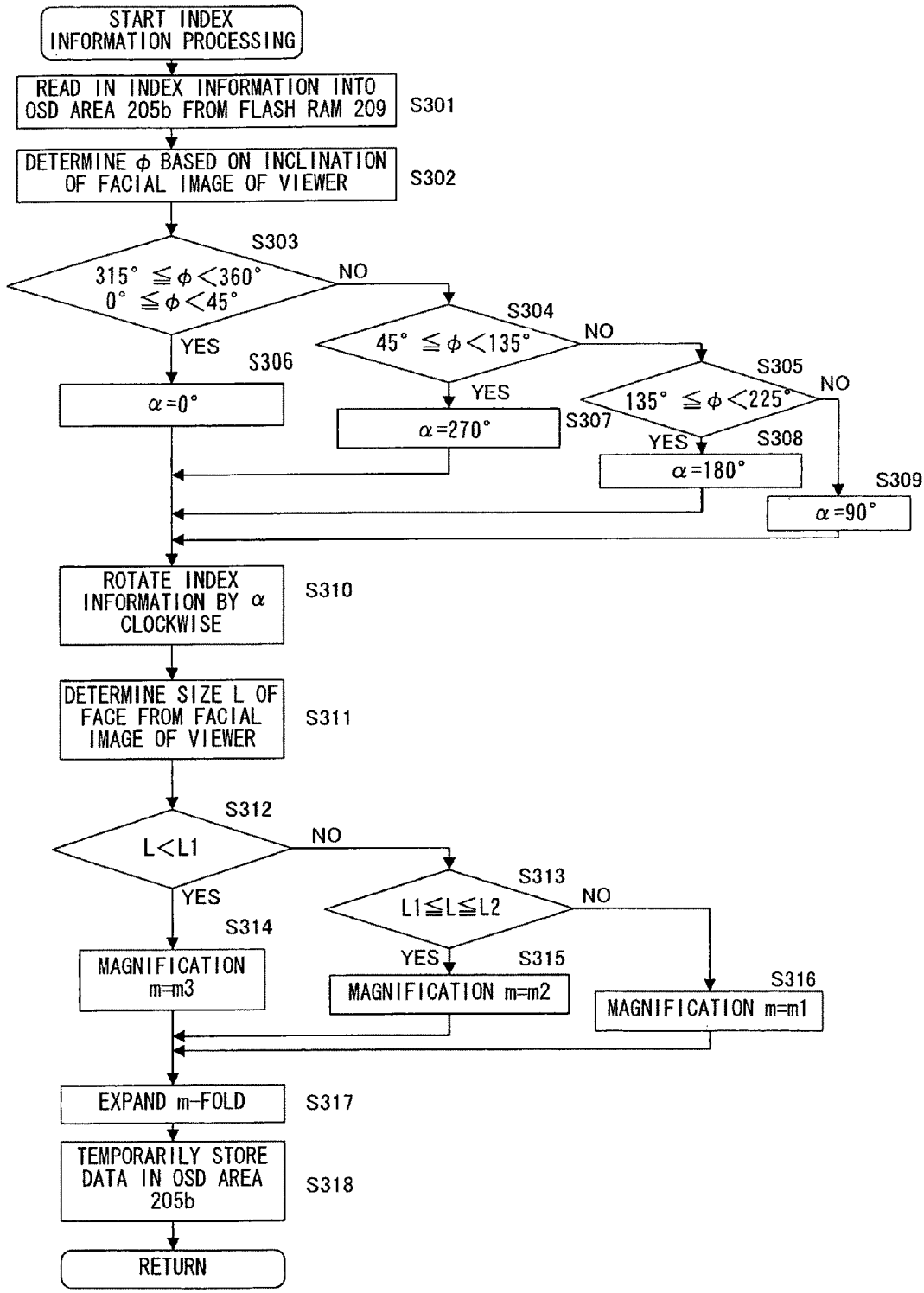

FIG. 26

| QUADRANT OF DIRECTION OF FACIAL IMAGE / DIRECTION OF IMAGE | A QUADRANT | B QUADRANT | C QUADRANT | D QUADRANT |
|---|---|---|---|---|
| SIDE 115 UP | $\beta = 0°$ | $\beta = 270°$ | $\beta = 180°$ | $\beta = 90°$ |
| SIDE 116 UP | $\beta = 90°$ | $\beta = 0°$ | $\beta = 270°$ | $\beta = 180°$ |
| SIDE 117 UP | $\beta = 180°$ | $\beta = 90°$ | $\beta = 0°$ | $\beta = 270°$ |
| SIDE 118 UP | $\beta = 270°$ | $\beta = 180°$ | $\beta = 90°$ | $\beta = 0°$ |

INFORMATION DISPLAYING APPARATUS

INCORPORATION BY REFERENCE

The disclosure of the following priority application(s) is/are herein incorporated by reference:

Japanese Patent Application No. 2008-002902 filed Jan. 10, 2008.

BACKGROUND OF THE INVENTION

1. Field of the Invention

The present invention relates to an information displaying apparatus that controls information to be displayed based on a state of the face of a viewer who has been photographed.

2. Description of Related Art

A display with good visibility to the viewer can be done by displaying still images information in close-up by using the technology disclosed in Japanese Laid-Open Patent Application No. 2005-26933. Japanese Laid-Open Patent Application No. 2007-264124 discloses among others a technology that performs image display that is easily viewable corresponding to a difference in eye color and to a surrounding color temperature. With the technology disclosed in Japanese Laid-Open Patent Application No. 2007-67782, it is possible to specify persons by their facial images taken and control functions of equipment available to the respective persons.

SUMMARY OF THE INVENTION

However, with the technology disclosed in Japanese Laid-Open Patent Application No. 2005-26933, it is necessary for the viewer to perform an operation in one way or another in order to achieve a display which is easy to see; for example, the viewer has to perform an operation to specify the degree of expansion when it is intended to display in an expanded fashion. Therefore, it takes time for the user to go to the trouble to specify the degree of the expansion when the distance between the display screen and the user is changed to make the expansion unnecessary any more, or when he or she wants to increase the degree of the expansion.

With the technology disclosed in Japanese Laid-Open Patent Application No. 2007-264124, only the brightness of the display is appropriately adjusted. Therefore, no display that is easy to see can always be obtained depending on the positions of the displaying apparatus and the viewer. Use of the technology disclosed in Japanese Laid-Open Patent Application No. 2007-67782 makes it possible to set the display screen so as to meet the preference of each user. However, there is no guarantee that the display is always easy to see when the positions of the displaying apparatus and the viewer are changed.

In view of the above-mentioned problems, the present invention is made to obtain a display that is easy to be seen by a viewer by an automatic operation to control the form of display information based on a facial image of the viewer (observer) who looks into the display screen.

An information displaying apparatus according to a 1st aspect of the present invention comprises: a memory control unit that stores information to a storage medium, and outputs the information from the storage medium; a display that displays the information output from the storage medium in a predetermined display form on a screen of the display; an image-capturing unit that captures an image of an observer in a state to observe the display and outputs an image signal; a facial image detection unit that detects an inclination of a facial image of the observer based on the image signal; and a display form change unit that changes the display form of the information to be displayed on the screen, and in the information displaying apparatus the display form change unit changes the display form so that the information to be displayed on the screen rotates by a predetermined rotation angle based on the inclination of the facial image detected by the facial image detection unit.

According to the 2nd aspect of the present invention, in the information displaying apparatus according to the 1st aspect, it is preferred that the information comprises index information that visually conveys an event and a content to the observer.

According to the 3rd aspect of the present invention, in the information displaying apparatus according to the 2nd aspect, the index information may comprise at least one of a character, a sign, a figure, and an icon.

According to the 4th aspect of the present invention, in the information displaying apparatus according to the 1st aspect, the information may comprise image information.

According to 5th aspect of the present invention, in the information displaying apparatus according to the 1st aspect, it is preferred that the display form change unit rotates the information based on the inclination of the facial image so that the information is substantially in front of and upright to the observer to change the display form.

According to the 6th aspect of the present invention, it is preferred that the information displaying apparatus according to the 1st aspect further comprises: a directional information determination unit that determines whether the information includes directional information, and in the information apparatus, the display form change unit may determine the rotation angle based on the inclination of the facial image and the directional information when it is determined by the directional information determination unit that the information includes the direction information.

According to the 7th aspect of the present invention, in the information displaying apparatus according to the 6th aspect, the display form change unit may determine a standard display size of the information based on the inclination of the facial image and the directional information.

According to the 8th aspect of the invention, it is preferred that the information displaying apparatus according to the 1st aspect further comprises: a directional information determination unit that determines whether the information includes directional information, and in the information displaying apparatus, the facial image detection unit further includes: a pattern determination unit that determines whether there is a specific pattern in the information. In the information displaying apparatus, when it is determined by the directional information determination unit that no directional information is included in the information and when it is determined by the pattern determination unit that the specific pattern is included in the information, the display form change unit may determine directional information based on the specific pattern.

According to the 9th aspect of the present invention, in the information displaying apparatus according to the 1st, it is preferred that the image detection unit further comprises a pattern determination unit that determines whether there is a specific pattern in the information, and the information displaying apparatus further comprises: a directional information determination unit that determines whether the information includes directional information; and a prohibition unit that prohibits rotation of the information by the display form change unit when it is determined by the directional information determination unit that no directional information is included in the information and when it is determined by the pattern determination unit that no specific pattern is included in the information.

According to the 10th aspect of the present invention, the information displaying apparatus according to the 1st aspect may further comprise: a mode switch unit that switches operation between a replay mode and another mode other than the replay mode; and a recognition unit that recognizes that there is a plurality of the facial images detected by the facial image detection unit, and in the information displaying apparatus, if it is recognized by the recognition unit that there is a plurality of the facial images while the mode other than the replay mode is being executed, the mode switch unit may switch the mode from the mode other than the replay mode to the replay mode.

According to the 11th aspect of the present invention, in the information displaying apparatus according to the 1st aspect, the display form change unit may comprise a size change unit that changes a size of display of the information based on a size of the facial image detected by the facial image detection unit.

According to the 12th aspect of the present invention, in the information displaying apparatus according to the 11th aspect, it is preferred that the size change unit performs expansion or reduction processing so that the smaller the size of the facial image, the larger the information is displayed.

According to the 13th aspect of the present invention, in the information displaying apparatus according to the 11th aspect, it is preferred that the size change unit comprises at least one of: a display size selection unit that selects a predetermined size of display from a plurality of sizes of display included in the information based on the facial image; and an expansion/reduction unit that expands/reduces, respectively, the information at a predetermined magnification depending on the size of the facial image.

According to the 14th aspect of the present invention, the information displaying apparatus according to the 13th aspect may further comprise: a size determination unit that determines a size of the facial image detected by the facial image detection unit, and in the information displaying apparatus, it is preferred that when it is determined by the size determination unit that the size of the facial image is not less than a predetermined first threshold, the expansion/reduction unit expands or reduces the information at a predetermined magnification based on the first threshold, and when it is determined by the size determination unit that the size of the facial image is not more than a predetermined second threshold, the expansion/reduction unit expands or reduces the information at a predetermined magnification based on the second threshold.

According to the 15th aspect of the present invention, the information displaying apparatus according to the 1st aspect may further comprise: a recognition unit that recognizes that there is a plurality of the facial images detected by the facial image detection unit, and in the information displaying apparatus, it is preferred that when a plurality of the facial images is recognized by the recognition unit, the display form change unit changes the display form based on a facial image closest to a predetermined point in an image-capturing area captured by the image-capturing unit.

According to the 16th aspect of the present invention, in the information displaying apparatus according to the 1st aspect, it is preferred that the display is adapted to display the information in a plurality of directions in different display forms, and when the facial image detection unit detects a plurality of the facial images in a plurality of predetermined areas in an image-capturing area captured by the image-capturing unit, the display form change unit changes the display form based on a facial image in each area.

According to the 17th aspect of the invention, the information displaying apparatus according to the 1st aspect may further comprise: a power OFF unit that turns OFF power supply to a portion other than the facial image detection unit of the information displaying apparatus when no facial image is detected by the facial image detection unit for not less than a predetermined time.

According to the 18th aspect of the present invention, the information displaying apparatus according to the 17th aspect may further comprise: a power ON unit that turns ON power supply when a facial image is detected within a predetermined time from a time at which the power supply to the portion other than the facial image detection unit of the information displaying apparatus has been turned OFF by the power OFF unit.

An information displaying apparatus according to the 19th aspect of the present invention comprises: a memory control unit that stores information to a storage medium and outputs the information from the storage medium; a display that displays the information output from the storage medium in a predetermined display form on a screen of the display; an image-capturing unit that captures an image of an observer in a state to observe the display and outputs an image signal; a facial image detection unit that detects a position at which a facial image of the observer occupies the image-capturing area based on the image signal; and a display form change unit that changes the display form of the information to be displayed on the screen. In the information displaying apparatus, the display form change unit changes the display form so that the information to be displayed on the screen is distorted based on the position at which the facial image occupies the image-capturing area detected by the facial image detection unit.

According to the 20th aspect of the invention, in the information displaying apparatus according to the 19th aspect, it is preferred that the information comprises index information that visually conveys an event and a content to the observer.

According to the 21st aspect of the present invention, in the information displaying apparatus according to the 20th aspect, it is preferred that the index information comprises at least one of a character, a sign, a figure, and an icon.

According to the 22nd aspect of the present invention, in the information displaying apparatus according to the 19th aspect, it is preferred that the information comprises image information.

According to the 23rd aspect of the present invention, the information displaying apparatus according to the 19th aspect may further comprise: a mode switch unit that switches operation between a replay mode and another mode other than the replay mode; and a recognition unit that recognizes that there is a plurality of the facial images detected by the facial image detection unit, and in the information displaying apparatus, it is preferred that if it is recognized by the recognition unit that there is a plurality of the facial images while the mode other than the replay mode is being executed, the mode switch unit switches the mode from the mode other than the replay mode to the replay mode.

According to the 24th aspect of the present invention, in the information displaying apparatus according to the 19th aspect, it is preferred that the display form change unit includes a size change unit that changes a size of display of the information based on a size of the facial image detected by the facial image detection unit.

According to the 25th aspect of the present invention, in the information displaying apparatus according to the 24th, it is preferred that the size change unit performs expansion or reduction processing so that the smaller the size of the facial image, the larger the information is displayed.

According to the 26th aspect of the present invention, in the information displaying apparatus according to the 24th aspect, it is preferred that the size change unit comprises at least one of: a display size selection unit that selects a predetermined size of display from a plurality of sizes of display included in the information based on the facial image, and an expansion/reduction unit that expands/reduces, respectively, the information at a predetermined magnification depending on the size of the facial image.

According to the 27th aspect of the present invention, the information displaying apparatus according to the 26th may further comprise: a size determination unit that determines a size of the facial image detected by the facial image detection unit, and in the information displaying apparatus, it is preferred that when it is determined that the size of the facial image is not less than a predetermined first threshold, the expansion/reduction unit expands or reduces the information at a predetermined magnification based on the first threshold, and when it is determined that the size of the facial image is not more than a predetermined second threshold, the expansion/reduction unit expands or reduces the information at a predetermined magnification based on the second threshold.

According to the 28th aspect of the present invention, in the information displaying apparatus according to the 19th aspect, it is preferred that the display form change unit elongates the information if the position at which the facial image occupies the image-capturing area is outside a predetermined area.

According to the 29th aspect if the present invention, in the information displaying apparatus according to the 28th aspect, it is preferred that the display form change unit elongates the information displayed on the screen in an area remoter from the observer at a higher elongation ratio than the information displayed on the screen in an area closer to the observer.

According to the 30th aspect of the present invention, the information displaying apparatus according to the 19th aspect may further comprise: a recognition unit that recognizes that there is a plurality of the facial images detected by the facial image detection unit, and in the information displaying apparatus, it is preferred that when a plurality of the facial images has been recognized by the recognition unit, the display form change unit changes the display form based on a facial image closest to a predetermined point in the image-capturing area captured by the image-capturing unit.

According to the 31st aspect of the present invention, in the information displaying apparatus according to the 19th aspect, it is preferred that the display is adapted to be capable of displaying the information in a plurality of directions in different display forms, and when the facial image detection unit detects a plurality of the facial images in a plurality of predetermined areas in the image-capturing area captured by the image-capturing unit, the display form change unit changes the display form based on a facial image in each area.

According to the 32nd aspect of the present invention, the information displaying apparatus according to the 19th aspect may further comprise: a power OFF unit that turns OFF power supply to a portion other than the facial image detection unit of the information displaying apparatus when no facial image is detected by the facial image detection unit for not less than a predetermined time.

According to the 33rd aspect of the present invention, the information displaying apparatus according to the 32nd aspect may further comprise: a power ON unit that turns ON power supply when a facial image is detected within a predetermined time from a time at which the power supply to the portion other than the facial image detection unit of the information displaying apparatus is turned OFF by the power OFF unit.

An information displaying apparatus according to the 34th aspect of the present invention comprises: a memory control unit that stores first information and second information to a storage medium and outputs the first information and the second information from the storage medium; a display that displays the first information and the second information output from the storage medium in predetermined display forms on a screen of the display; an image-capturing unit that captures an image of an observer in a state to observe the display and outputs an image signal; a facial image detection unit that detects an inclination of a facial image of the observer based on the image signal; and a display form change unit that changes the display form of at least one of the first information and the second information to be displayed on the screen, and in the information displaying apparatus the display form change unit changes the display form so that at least one of the first information and the second information to be displayed on the screen rotates at a predetermined rotation angle based on the inclination of the facial image detected by the facial image detection unit.

An information displaying apparatus according to the 35th aspect of the present invention comprises: a memory control unit that stores first information and second information to a storage medium and outputs the first information and the second information from the storage medium; a display that displays the first information and the second information output from the storage medium in predetermined display forms on a screen of the display; an image-capturing unit that captures an image of an observer in a state to observe the display and outputs an image signal; a facial image detection unit that detects a position at which a facial image of the observer occupies the image-capturing area based on the image signal; and a display form change unit that changes the display form of at least one of the first information and the second information to be displayed on the screen, and in the information displaying apparatus the display form change unit changes the display form so that at least one of the first information and the second information to be displayed on the screen is distorted based on the position at which the facial image occupies the image-capturing area detected by the facial image detection unit.

BRIEF DESCRIPTION OF THE DRAWINGS

FIG. 9 is a flowchart that illustrates processing for recognizing a face;

FIG. 10 is a flowchart that illustrates processing of index information;

FIG. 26 is a diagram showing an example of a rotation angle β determined by a combination of the inclination φ of the facial image and the direction of the image;

DESCRIPTION OF PREFERRED EMBODIMENTS

A digital camera equipped with the information displaying apparatus according to the present invention is illustrated and an embodiment thereof is described below. In the embodiment detailed below, the present invention is applied to a digital camera. However, the present invention can be embodied in other forms as far as it relates to electronic equipment that includes a display device. The digital camera according to an embodiment of the invention will now be described by way of example with reference to FIGS. 1 through 45.

First Embodiment

1. Arrangement

Figure 1:
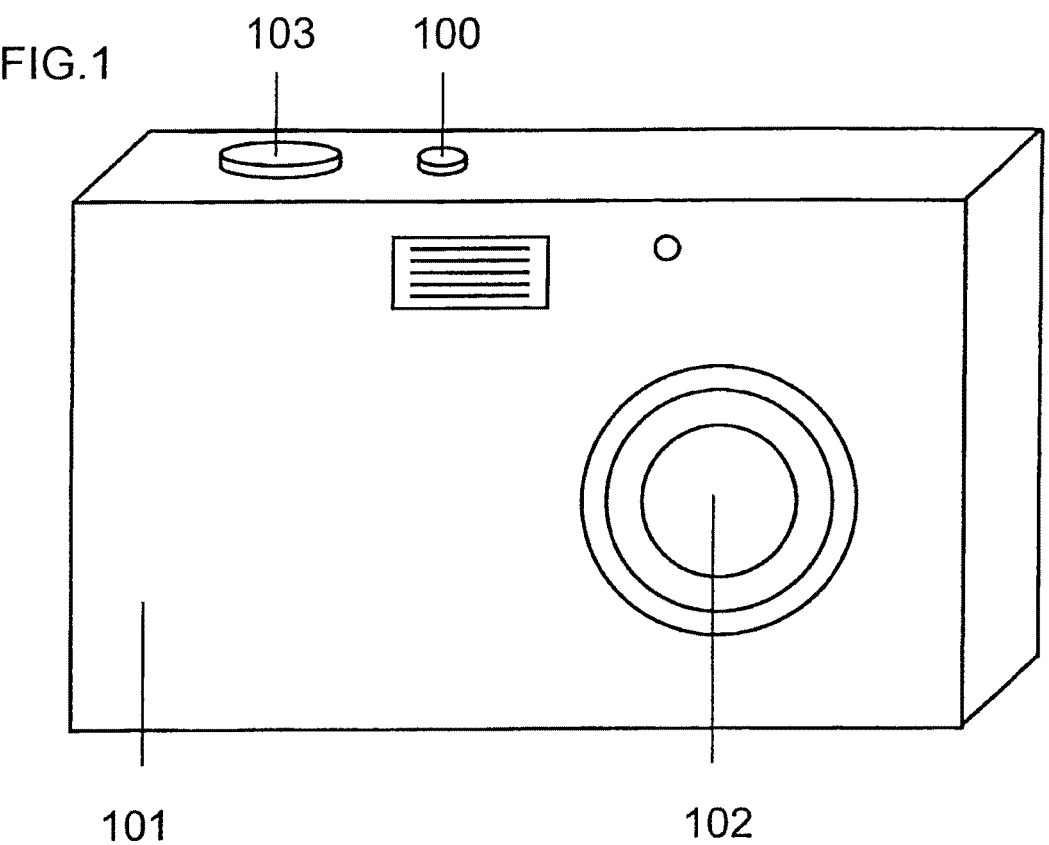
FIG. 1 is a perspective front view showing the construction of a digital camera according to the present invention.
Figure 2:
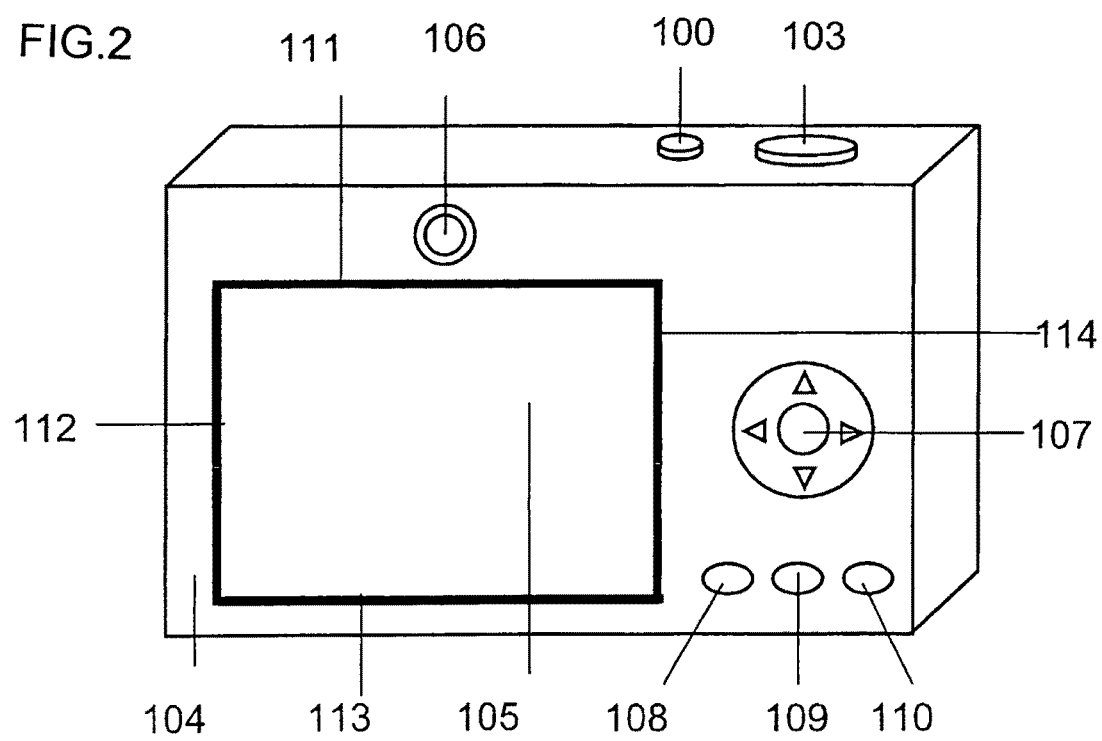
FIG. 2 is a perspective rear view showing the construction of the digital camera shown in FIG. 1.

FIGS. 1 and 2 each are a perspective view showing a digital camera according to the present invention. A power supply button 100 mounted on an upper part of the digital camera shown in FIG. 1 is a button that instructs turning ON or OFF of the power supply of the digital camera. On a surface 101 of the digital camera, there is provided a photographic lens 102 that takes optical information of a subject in order to capture an image of the subject. A release button 103 is mounted on the upper part of the digital camera. It is a button that instructs start of image-capturing using the photographic lens 102. A surface 104 shown in FIG. 2 is usually a user side (viewer side and observer side) of the digital camera. On the surface 104, there are provided an LCD 105, a photographic lens 106, an operation unit 107 for performing various settings therewith, a replay button 108, a shooting mode button 109, and a menu button 110. The LCD 105 is a liquid crystal panel that displays the image information, icons, characters, figures, and signs, and so on A side 111 is an upper edge of the LCD 105, a side 112 is a left edge of the LCD 105, a side 113 is a lower edge of the LCD 105, and a side 114 is a right edge of the LCD 105. The photographic lens 106 is a lens used to capture an image of a user (viewer or observer) of the digital camera. The operation unit 107 is an operation member used to move a cursor displayed in the LCD 105 or make a decision on a selected function. The digital camera of this embodiment has three modes, i.e., a replay mode in which the image stored in a recording medium is replayed, a shooting mode in which an image of a subject is captured, and a menu mode in which various settings of the camera are made. The above-mentioned various modes are adapted to be switchable among them by pressing the replay button 108, the shooting mode button 109, and the menu button 110, respectively.

Figure 3:
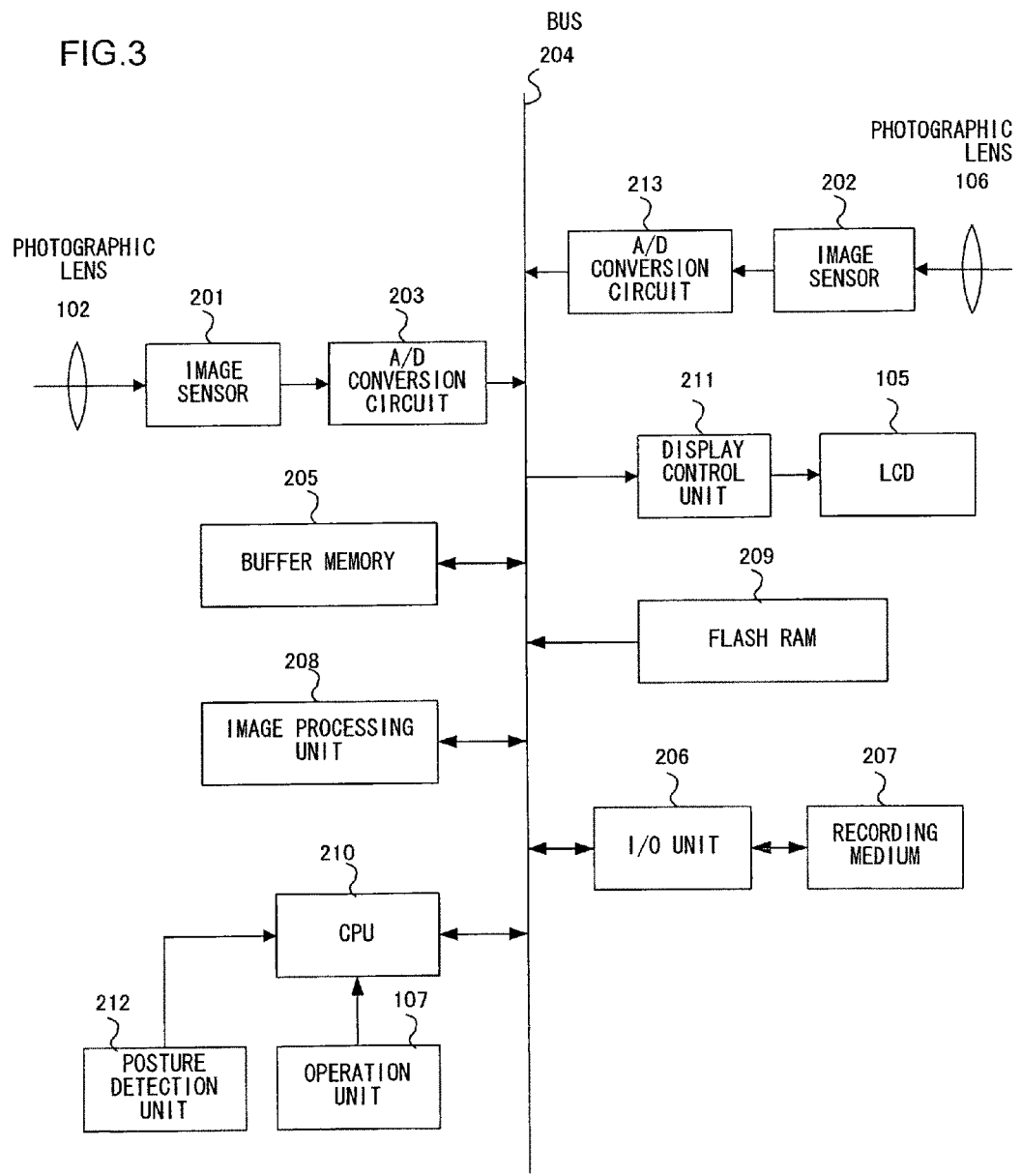
FIG. 3 is a view showing the internal construction of the digital camera shown in FIGS. 1 and 2.

The internal construction of the digital camera according to an embodiment of the present invention will now be described with reference to the block diagram shown in FIG. 3. The inside structure of the digital camera includes an image sensor 201, an image sensor 202, an A/D conversion circuit 203 (analogue/digital conversion circuit), an A/D conversion circuit 213, a bus 204, a buffer memory 205, an I/O unit 206, a recording medium 207, an image processing unit 208, a flash RAM 209, a CPU 210, a display control unit 211, and a posture detection unit 212. The A/D conversion circuit 203, the buffer memory 205, the I/O unit 206, the image processing unit 208, the flash RAM 209, the CPU 210, and the display control unit 211 are connected to each other through the bus 204.

Figure 4:
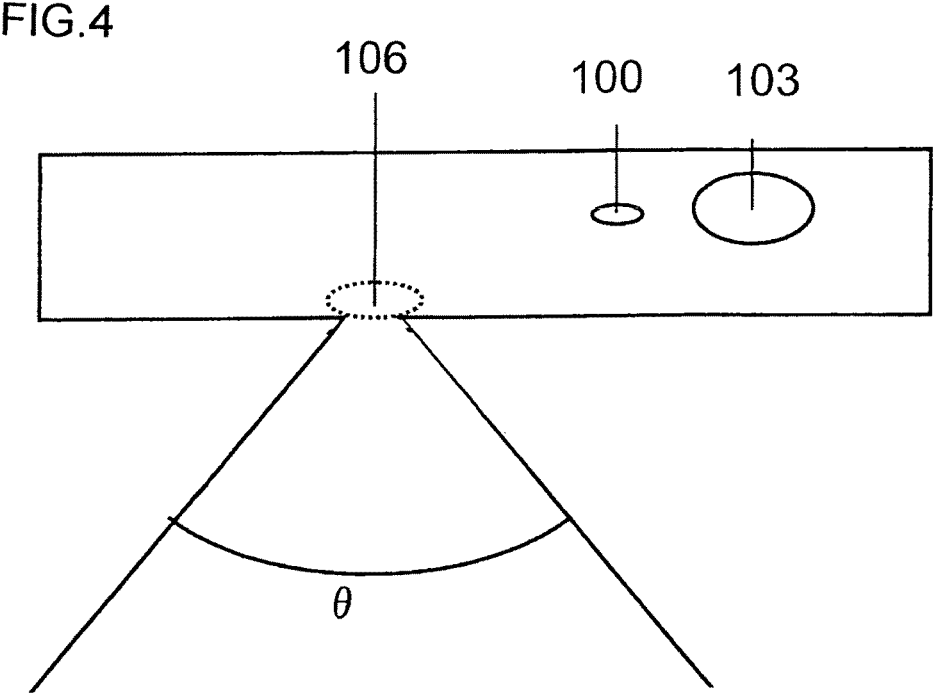
FIG. 4 is a diagram showing the construction of the digital camera shown in FIGS. 1 and 2 seen from above and an image-capturing area.

The image sensor 201 and the image sensor 202 are photoelectric devices, which are elements to convert an optical image into an analog electrical signal. The image sensor 201 is an image sensor provided in order to capture an image of a subject in the shooting mode and is disposed in a later stage of the photographic lens 102. The image sensor 202, which is to capture an image of the user (viewer) of the digital camera, is disposed in a later stage of the photographic lens 106. The photographic lens 106 in the first embodiment is described as including a lens capable of capturing an image of a wide angle area of about 20 mm in terms of a focal length of 35 mm size film camera (having a field angle θ nearly equal to 94 (θ≈94)) as shown in FIG. 4.

Figure 5:
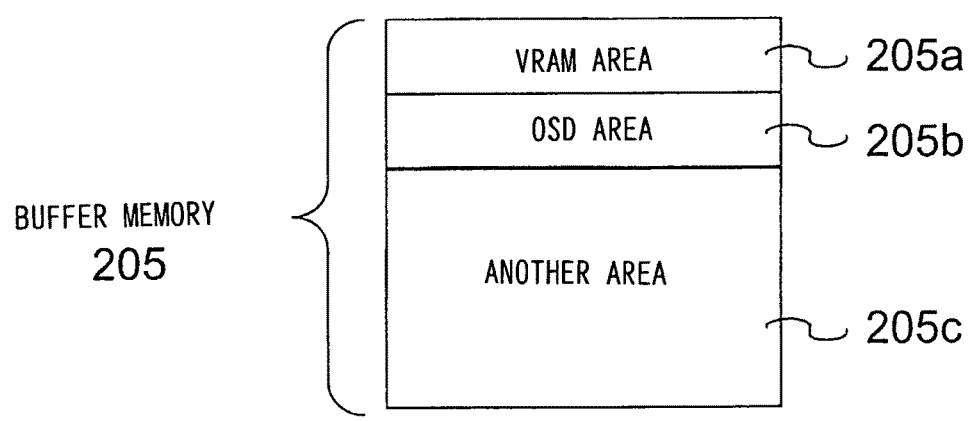
FIG. 5 is a diagram showing the internal construction of a buffer memory.

The A/D conversion unit 203 converts analog electric signals output from the image sensor 201 into digital image signals. Similarly, the A/D conversion unit 213 converts analog electric signals output from the image sensor 202 into digital image signals. The image information digitalized by the A/D conversion circuit 203 is once accumulated in the buffer memory 205 through the bus 204. The buffer memory 205 is constituted by a VRAM area 205a where the image information displayed in the LCD 105 is temporarily accumulated, an OSD area 205b to accumulate index information displayed in the LCD 105 temporarily, and another area 205c as shown in FIG. 5. The image information digitalized by the A/D conversion circuit 213 is once stored in the other area 205c through the bus 204.

The recording medium 207 is a detachable recording medium that preserves the image information, and it is connected with the bus 204 through the I/O unit 206. Saving of the image information into the recording medium 207 and reading out the image information from the recording medium 207 are performed based on the instruction from the CPU 210. The image processing unit 208 is a unit that performs detection of facial images of the viewers, determination of the number of facial images of the viewers, determination of the size of the facial image of the viewers, determination of the inclination of the facial images of the viewers, and determination of positions of the facial images of the viewers. It also performs determination as to whether there is a facial image in the image information and determination of the inclination of the facial image in the displayed image information as well as processing of the image information. The image processing unit 208 is driven according to the instruction from the CPU 210. The CPU 210 controls the power supply of the digital camera.

The posture detection unit 212 detects the posture of the digital camera (top and bottom, and right and left). There have been known a method of detecting a posture in which the electroconductivity of the pendulum as disclosed in Japanese Laid-open Patent Application No. 2005-236883 is used to detect the posture and a method in which the metal sphere as disclosed in Japanese Laid-open Patent Application No. 2004-286614 is used to detect the posture. The posture detection unit 212 may be adapted to use these methods to determine the posture of the camera based on two axes, one being the direction of the gravity acceleration and the other being vertical to the direction of the gravity acceleration and parallel to the surface 101 of the camera. Alternatively, it may use a known technology using a gyro, etc. (Japanese Laid-open Patent Application No. 2005-260666). The CPU 210 imparts the image information acquired by capturing an image via the photographic lens 102 with the directional information (top and bottom, and right and left) based on the posture detected by the posture detection unit.

Now, an On Screen Display (hereafter, OSD) is described. The display on the LCD 105 is executed by using the OSD function. This function is to display an icon, a character, a figure, and a sign, etc. (index information) over a replayed picture displayed in the replay mode or on a through image displayed in the shooting mode of the display in the play mode in superposition. In this embodiment, the index information to be displayed is stored to the flash RAM 209. The CPU 210 stores predetermined index information in the OSD area 205b according to the status in which the camera is used by the user in stages before it is displayed in the LCD 105. The image processing unit 208 performs processing for changing the form of display based on the state of facial image of the user and stores the index information in the OSD area 205b again. The image information to be displayed is stored in the buffer memory 205 by the CPU 210 in stages before it is displayed in the LCD 105. The display control unit 211 controls the image information and the index information such that the index information stored in the OSD area is displayed on the image information in superposition on the LCD 105. The details of the processing by the camera are described later on.

Figure 6:
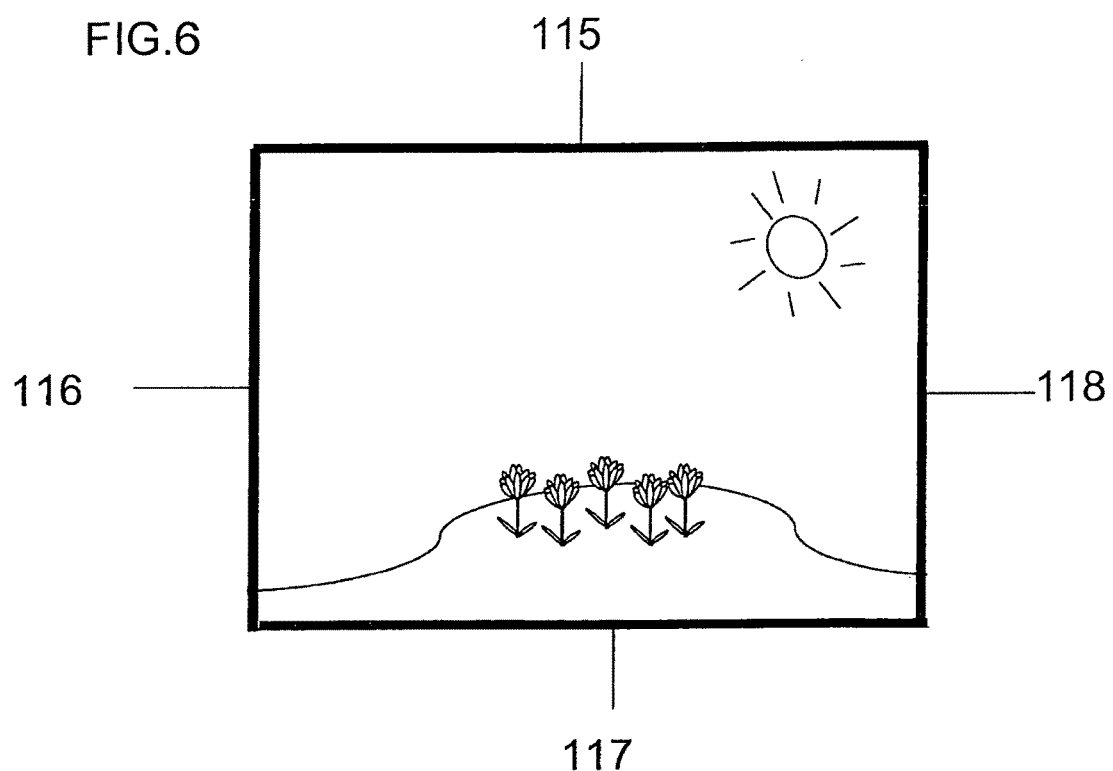
FIG. 6 is a diagram showing each side of image information.

The display assistance function is described. The display assistance function is concerned with the image information and index information displayed on the LCD 105. This function is to display information that has undergone expansion/reduction processing and rotation processing based on a relative position of the digital camera and the viewer unlike an ordinary display mode. The visibility to the viewer can be improved by using this function. The display assistance is described separately for the display assistance in the replay mode and the display assistance in the shooting mode/menu mode as follows. The case where no display assistance is used is described with reference to FIG. 6. It is assumed that the LCD 105 displays image information with which direction information is imparted such that the side 115 represents an upper edge portion, the side 116 represents a left edge portion, the side 117 represents a lower edge portion, and the side 118 represents a right edge portion, respectively, of the image as shown in FIG. 6. In this case, the side 115 is on the side 111, the side 116 is on the side 112, the side 117 is on the side 113, and the side 118 is on the side 114. Also, the image is displayed such that the length of the side 115 is equal to that of the side 111, the length of the side 116 is equal to that of the side 112, the length of the side 117 is equal to that of the side 113, and the length of the side 118 is equal to that of the side 114.

2. Display Assistance in the Play Mode

Figure 7:
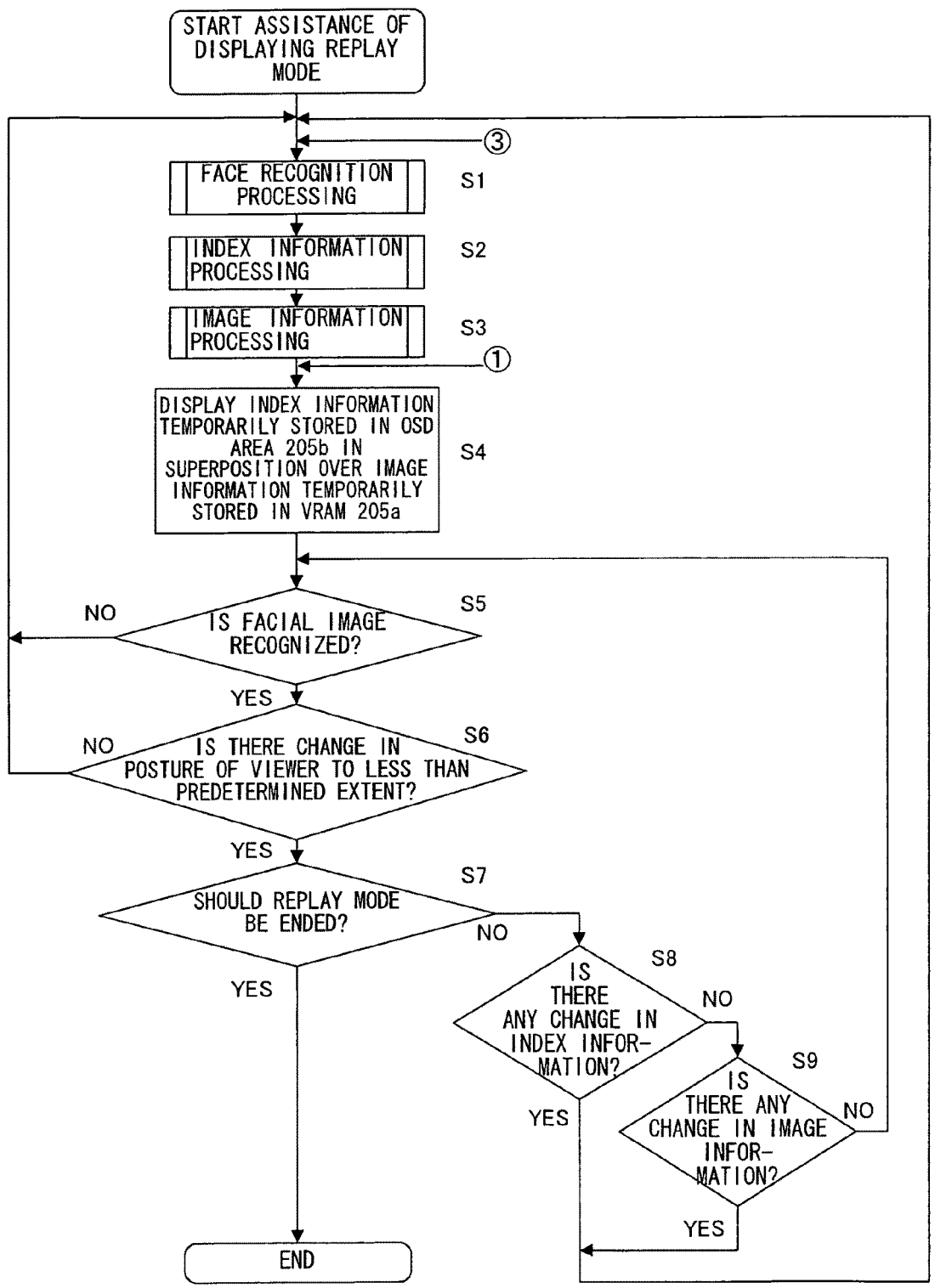
FIG. 7 is a flowchart that illustrates processing for assisting display executed in the replay mode.

The processing of display assistance in the replay mode is now explained with reference to the flowchart presented in FIG. 7. In step S1, the image processing unit 208 performs processing for recognizing a facial image of the viewer who observes the LCD 105 or who is located in a place where it is possible to observe the LCD 105 (hereafter, this processing is referred to as "face recognition processing"). In step S2, the image processing unit 208 performs processing the index information (hereafter, "index information processing") according to the instruction from the CPU 210 and the control proceeds to step S3. In step S3, the image processing unit 208 processes the index information according to the instruction from the CPU 210 and the control proceeds to step S4. In step S4, the display control unit 211 controls the image information and the index information such that the index information temporarily accumulated in the OSD area 205*b* is displayed in superposition over the image information temporarily stored in the VRAM 205*a*.

In step S5, the image processing unit 208 determines whether the facial image of the viewer is recognized. If no facial image is recognized, the control shifts to step S1. If a facial image is recognized, the control proceeds to step S6. In step S6, if it is determined by the image processing unit 208 that the size of facial image or the inclination in the facial image of the viewer of an image-capturing plane has changed to a predetermined extent or more, the control shifts to step S1. If it has been determined that the change has occurred to an extent less than the predetermined extent, the control shifts to step S7. In step S7, the CPU 210 determines whether end of the replay mode (shift to other modes or turning OFF the power) has been instructed by the user. The control proceeds to step S8 when the end of the replay mode has not been instructed. In step S8, the CPU 210 determines whether the index information has been changed (for instance, the icon has been changed due to a decrease in residual quantity of the battery). The control shifts to step S1 when it is determined that the index information has been changed. The control shifts to step S9 when it is determined that the index information has not been changed. In step S9, the CPU 210 determines whether the replay image has been changed. The control shifts to step S1 when it is determined that the replay image has been changed. The control shifts to step S5 when it is determined that the replayed image has not been changed. In step S7, the processing is ended when it is determined that it has been instructed by the user to end the replay mode. The recognition processing S1 on the facial image mentioned above, the processing S2 on the index information, and the processing of the image information will be detailed later separately.

3. The Display Assistance in the Shooting Mode/Menu Mode

Figure 8:
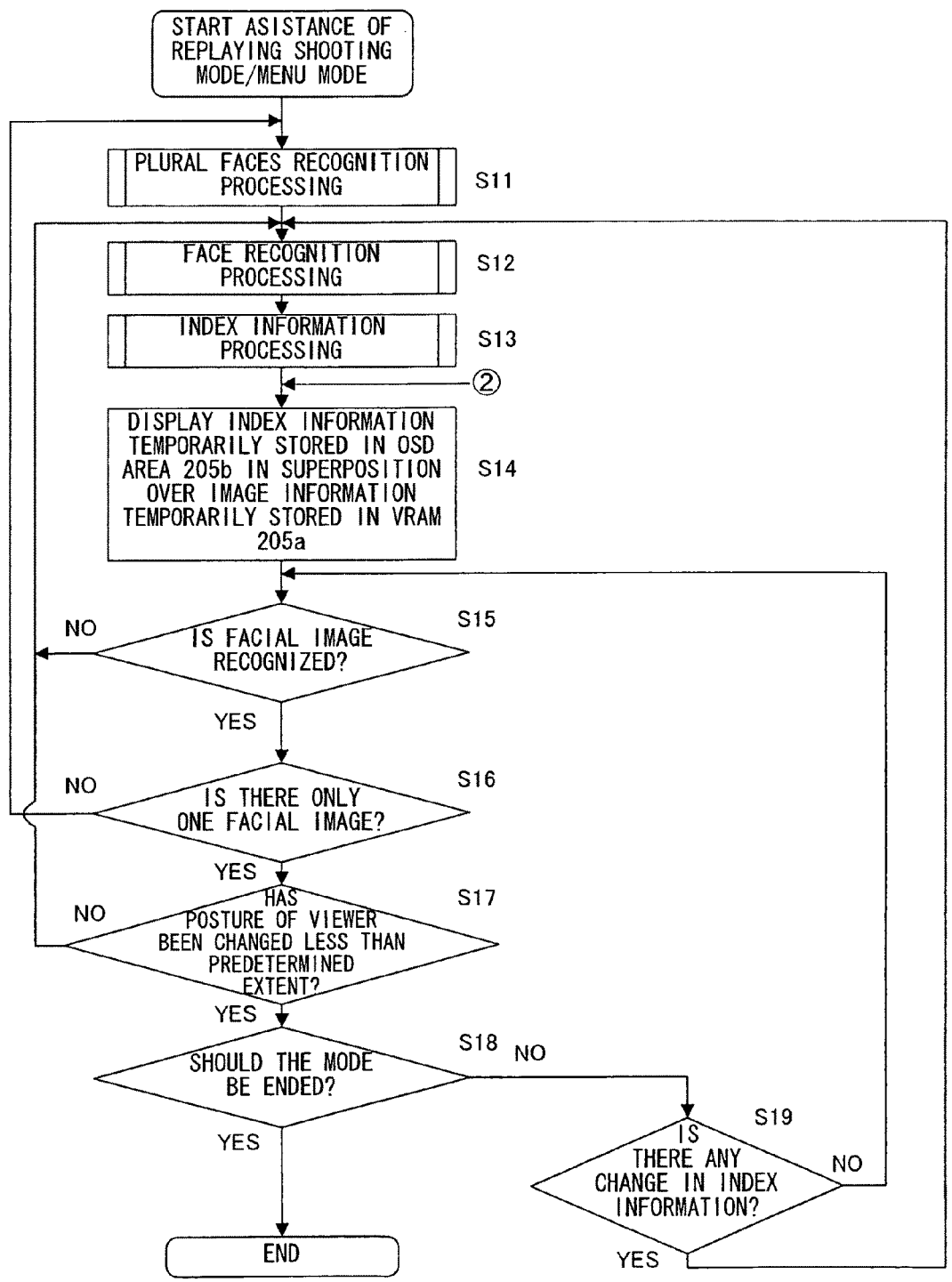
FIG. 8 is a flowchart that illustrates the processing for assisting display executed in the replay mode and in a menu mode.

The processing of display assist in the shooting mode and in the menu mode is explained in reference to the flowchart presented in FIG. 8. In the display assistance in the shooting mode and in the menu mode according to this embodiment, only the form of index information is processed. In the shooting mode, the processed index information is displayed on a through image of the background in superposition. In the menu mode, a through image, a replay image or a wallpaper, etc. are displayed in superposition over the index information as a background image. The shooting mode and the menu mode are usually used by one user. Therefore, when plural facial images are recognized in the shooting mode and in the menu mode, a message to invite the user to switch the mode to the replay mode is displayed. In step S11, the image processing unit 208 performs recognition of a plurality of facial images. In step S12, the image processing unit 208 performs recognition of a facial image. In step S13, the image processing unit 208 processes the index information and the control proceeds to step S14. In step S14, the display control unit 211 controls the image information and the index information such that the index information temporarily accumulated in the OSD area 205*b* is displayed in superposition over the image information as a background temporarily accumulated in the VRAM 205*a*.

In step S15, the image processing unit 208 determines whether the facial image of the viewer has been recognized. If no facial image has been recognized, the control shifts to step S12 and if a facial image has been recognized, the control proceeds to step S16. In step S16, the image processing unit 208 determines whether there is only one facial image of the viewer. The control proceeds to step S17 when only one facial image of the viewer has been recognized, and when plural facial images of the viewer have been recognized, the control shifts to step S11. In step S17, if it is determined by the image processing unit 208 that the size of facial image or the inclination in an image-capturing plane of facial image of the viewer has changed to at least a predetermined extent, the control shifts to step S12. If the change has occurred to an extent below the predetermined extent, the control shifts to step S18. In step S18, the CPU 210 determines whether end of the mode has been instructed by the user. The control proceeds to step S19 when the end of the replay mode has not been instructed. In step S19, the CPU 210 determines whether the index information has been changed. When it is determined that the index information has been changed, the control shifts to step S12 and the index information is processed. If it is determined in step S18 that end of the mode has been instructed by the user, this processing is ended. The recognition processing S11 on a plurality of facial images mentioned above, the recognition processing S12 on a facial image, and the processing of the index information will be detailed later separately.

4. Recognition Processing of a Facial Image

The recognition processing on a facial image is described in reference to the flowchart presented in FIG. 9. In step S101, if it is determined by the image processing unit 208 that a facial image of the viewer has been recognized, the control shifts to step S104, and if no facial of the viewer has been recognized, the control shifts to step S102. In step S102, the CPU 210 starts counting elapsed time T and the control shifts to step S103. In step S103, CPU 210 determines whether the elapsed time T exceeded a predetermined elapsed time T1. T1 is assumed to be one minute in this embodiment. The control proceeds to S105 if the elapsed time T is less than one minute, and the control proceeds to step S106 if the elapsed time T is one minute or more.

In step S105, if it is determined by the image processing unit 208 that a facial image of the viewer has been recognized or the CPU 210 has detected an operation by the user, the control shifts to step S104. On the other hand, in step S105, if it is determined by the image processing unit 208 that no facial image of the viewer has been recognized and the CPU 210 has detected no operation by the user, the control shifts to step S103. In step S106, the display control unit 211 displays on the LCD 105 a message to ask if it is acceptable to switch the mode to an energy-saving mode.

In this embodiment, "ENERGY-SAVING MODE, YES or NO?" is displayed to invite the user to decide by selecting either one with touching a cursor key. In step S107, the CPU 210 determines whether the selection of energy-saving mode has been made by the user. The control proceeds to step S108 if it is determined by the CPU 210 that the energy-saving mode has been selected by the user, and the control proceeds to step S113 if the energy-saving mode has not been selected. In step S108, the CPU 210 determines whether YES or NO has been selected. The control proceeds to step S109 if it is determined that YES has been selected, and the control proceeds to step S113 if NO has been selected. In step S109, the power supply to parts excluding the mechanism necessary for the face recognition by the digital camera (for instance, power supply etc. to the LCD 105) is turned OFF as instructed by the CPU 210 to switch the operation mode to the energy-saving mode.

In step S110, the CPU 210 temporarily stores in the OSD area 205*b* predetermined index information to be displayed and the control proceeds to step S111. In step S111, the CPU 210 determines whether the present mode is the replay mode. If it is the replay mode, the control proceeds to step S112, where the image information to be replayed is temporarily accumulated in the VRAM 205*a*, and the control shifts to step S4 shown in the flowchart of FIG. 7. On the other hand, when it is determined in step S111 that the current mode is other than the replay mode, the control shifts to step S14 shown in the flowchart of FIG. 8.

In step S113, the CPU 210 determines whether the elapsed time T has reached T2 or more. T2 is assumed to be two minutes in this embodiment. Therefore when the elapsed time T2 is 2 minutes or more, the control proceeds to step S109 and the CPU 210 executes the energy-saving mode. On the other hand, when the elapsed time T2 is less than 2 minutes, the control shifts to step S107.

In step S109, if the energy-saving mode is executed, the control proceeds to step S114. If the image processing unit 208 recognizes a facial image or if the CPU 210 determines that there has been an operation of the digital camera by the user, the control proceeds to step S115. On the other hand, in step S114, the control proceeds to step S116 when the image processing unit 208 recognizes no facial image and the CPU 210 determines that there has been no operation of the digital camera by the user.

In step S115, the CPU 210 turns ON the power supply made to turn OFF partially in step S109 to cancel the energy-saving mode, and the control proceeds to step S104. In step S116, the CPU 210 determines whether the elapsed time T has reached or exceeds T3. T3 is assumed to be five minutes in this embodiment. Therefore, when the elapsed time T is 5 minutes or more, the control proceeds to step S117. On the other hand, when the elapsed time T is less than 5 minutes, the control proceeds to step S114. In step S117, the power supply to the digital camera is turned OFF by the CPU 210. Moreover, the CPU 210 determines whether there has been an operation by the user in step S104. When there has been no operation by the user, the control returns to the main flow to end this processing. On the other hand, if it is determined that there has been an operation by the user, the control proceeds to step S118 where the CPU 210 accepts the input operation and performs appropriate processing in response to the input operation. Then, the control returns to the main flow.

5. Processing of Index Information

The processing procedure of the index information will be described with reference to the flowchart shown in FIG. 10 illustrating the processing of the index information and FIGS. 11A through 24. In step S301, the CPU 210 reads in the index information saved in the flash RAM 209 and once saves it in the OSD area 205*b*. Then, the control proceeds to step S302. In step S302, it is determined by the image processing unit 208 at what an angle the face of the viewer is inclined with respect to the digital camera in a plane of the captured image. Then, the control proceeds to step S303.

FIG. 11A-FIG. 14B show the relationships between images captured by use of the photographic lens 106 and the angles of inclination of facial images. The area enclosed by a side 312, a side 313, a side 314, and a side 315 is an image-capturing area. The side 315 on the right of the image-capturing area corresponds to the side 112, which is the left side of the LCD. The side 313 on the left of the image-capturing area corresponds to the side 114, which is the right side of the LCD. The side 312 on the top of the image-capturing area corresponds to the side 111, which is the top side of the LCD. The side 314 on the bottom of the image-capturing area corresponds to the side 113 on the bottom of the LCD.

Figure 11A:
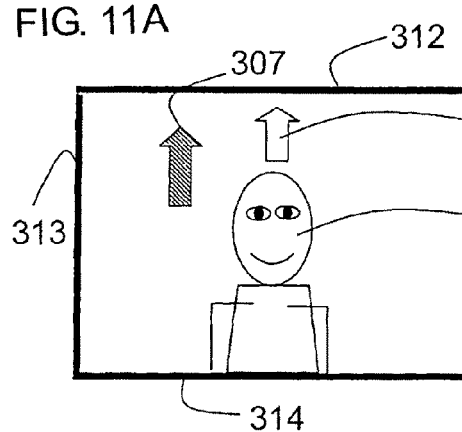
FIG. 11A illustrates an example of the inclination of a facial image of a viewer (observer) and FIG. 11B is a diagram showing the relationship between a face direction vector and a reference vector.
Figure 12A:
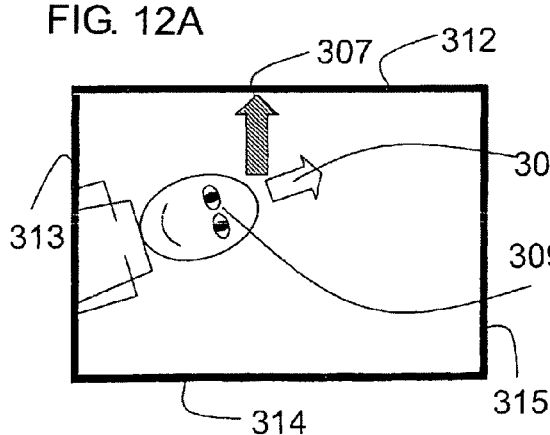
FIG. 12A illustrates an example of the inclination of a facial image of a viewer (observer) and FIG. 12B is a diagram showing the relationship between a face direction vector and a reference vector.
Figure 13A:
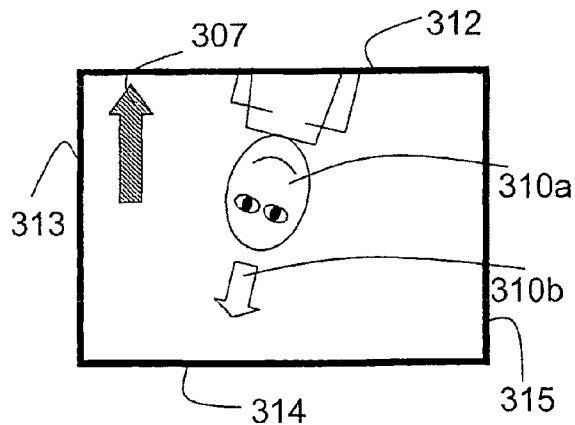
FIG. 13A illustrates an example of the inclination of a facial image of a viewer (observer) and FIG. 13B is a diagram showing the relationship between a face direction vector and a reference vector.
Figure 14A:
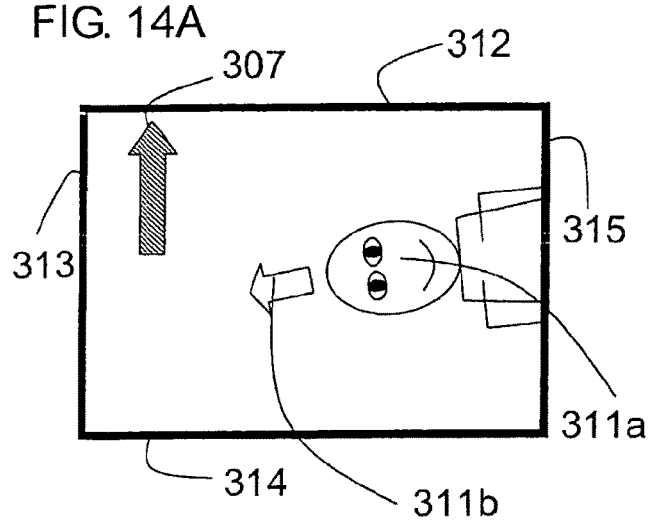
FIG. 14A illustrates an example of the inclination of a facial image of a viewer (observer) and FIG. 14B is a diagram showing the relationship between a face direction vector and a reference vector.

Accordingly, when describing hereafter based on the top and bottom, and the right and left of the LCD, a facial image 308*a* of FIG. 11A shows a facial image when the LCD is looked into from below. A facial image 309*a* of FIG. 12A shows a facial image when the LCD is looked into from the right. A facial image 310*a* of FIG. 13A shows a facial image when the LCD is looked into from above. Facial image 311*a* of FIG. 14A shows the facial image when LCD is looked into from the left. A reference vector 307 that serves as a criterion of the inclination of the facial image is a vector parallel to the side 313 and the side 315 headed from the lower side to the upper part. Face direction vectors 308*b*-311*b*, which are vectors each indicating the direction of a face, indicate upward directions of the facial images 308*a*-311*a* (the mouth being lower and the eyes being upper), respectively. The upward direction of the facial image is detected by using a well-known image detection technology.

Single index information processing is distributed to steps S306-S309 by steps S303-S305 based on the value of angle $\phi$ formed between the reference vector 307 and the face direction vector, and a rotation angle $\alpha$ is determined in steps S306-S309. The area of $\phi$ in which $315° \leq \phi < 360°$ and $0° \leq \phi < 45°$ is assumed to be a quadrant A, the area of $\phi$, in which $45° \leq \phi < 135°$ is assumed to be a quadrant B, the area of $\phi$ in which $135° \leq \phi < 225°$ is assumed to be a quadrant C, and the area of the $\phi$ in which $225° \leq \phi < 315°$ is assumed to be a quadrant D as shown in FIG. 11B, FIG. 12B, FIG. 13B, and FIG. 14B. When the face direction vector is in the quadrant A, $\alpha=0°$. When the face direction vector is in the quadrant B, $\alpha=27°$. When the face direction vector is in the quadrant C, $\alpha=180°$. When the face direction vector is in the quadrant D, $\alpha=90°$.

Figure 11B:
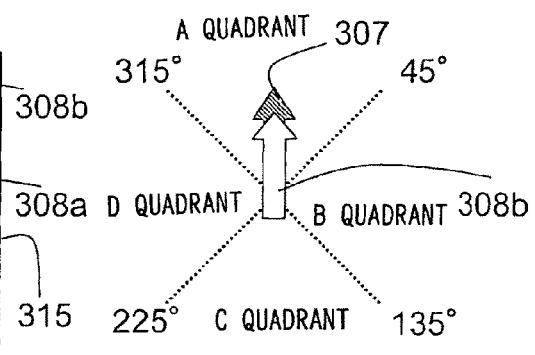
Figure 12B:
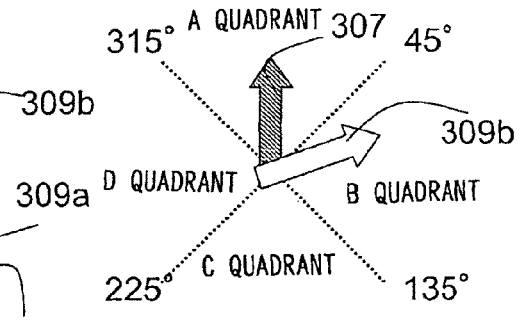
Figure 13B:
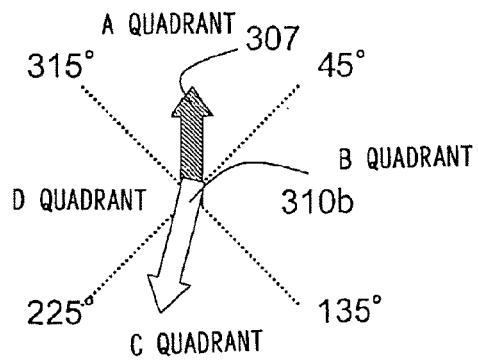
Figure 14B:
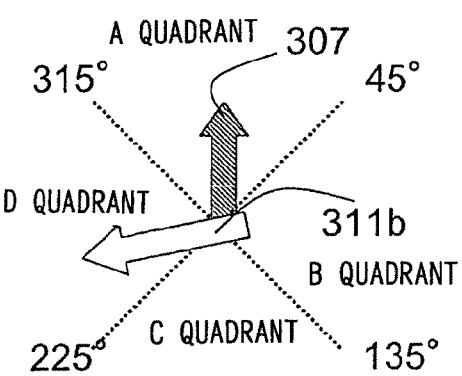
Figure 15:
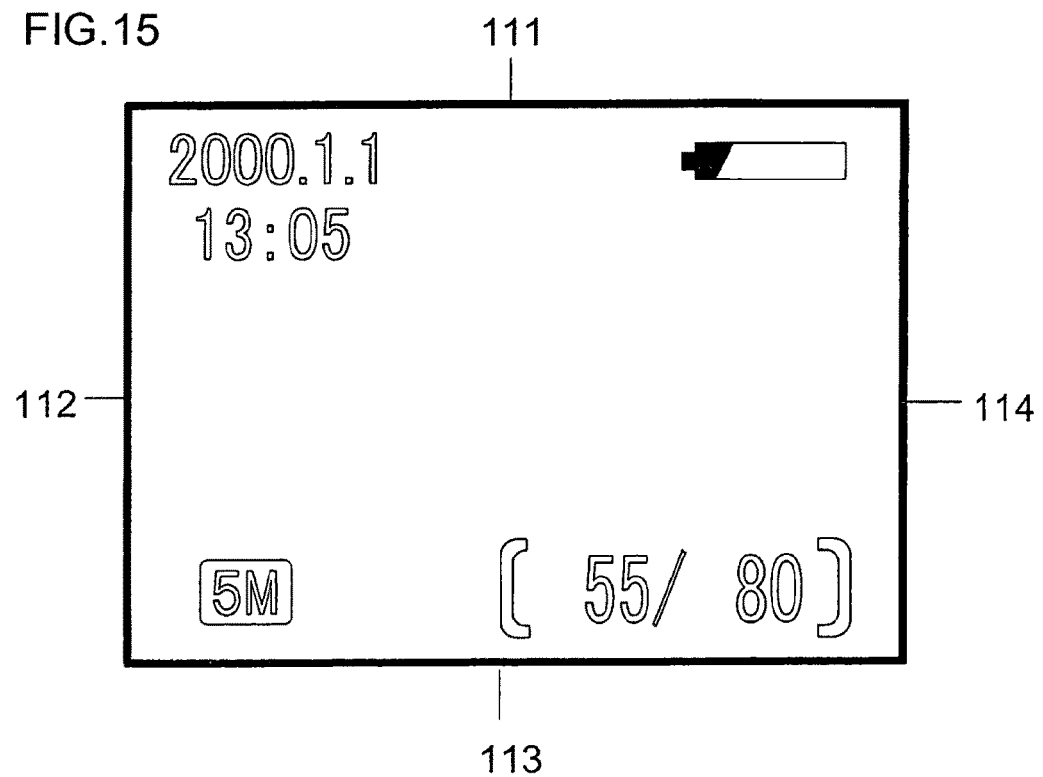
FIG. 15 is a diagram that illustrates an example of the inclination of displayed index information.
Figure 16:
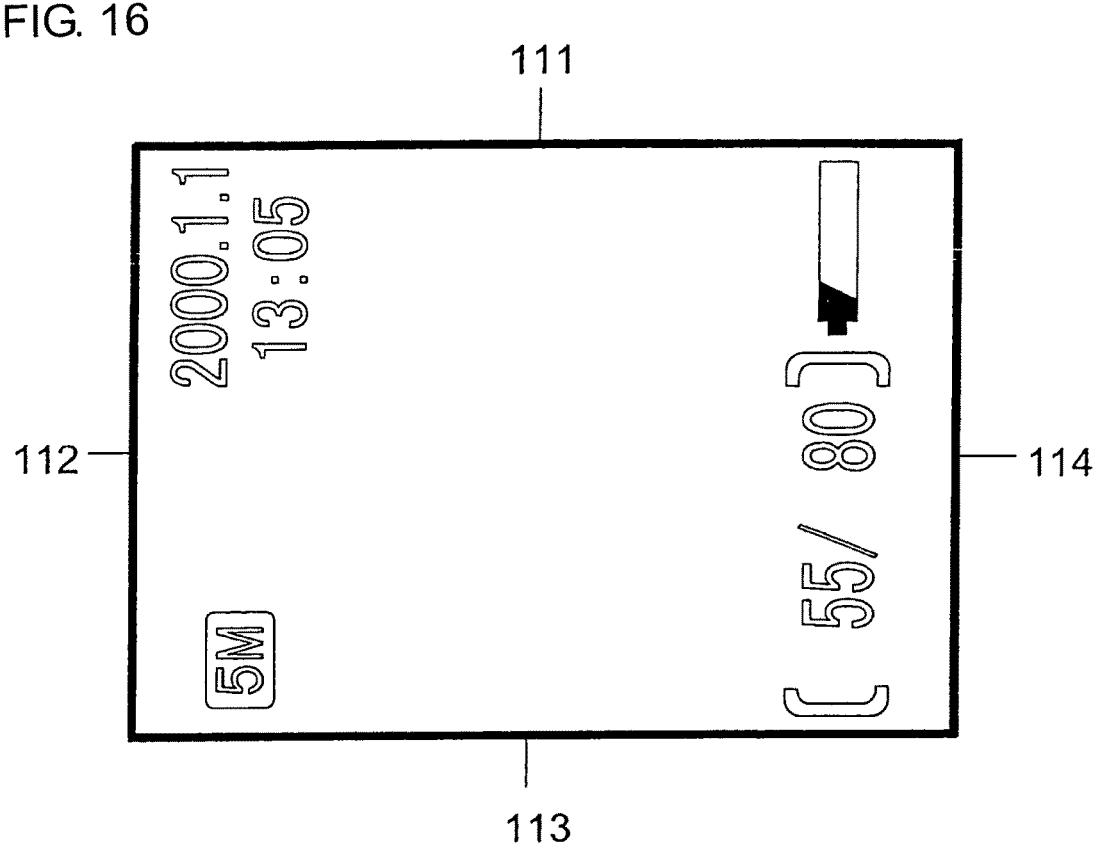
FIG. 16 is a diagram that illustrates an example of the inclination of displayed index information.
Figure 17:
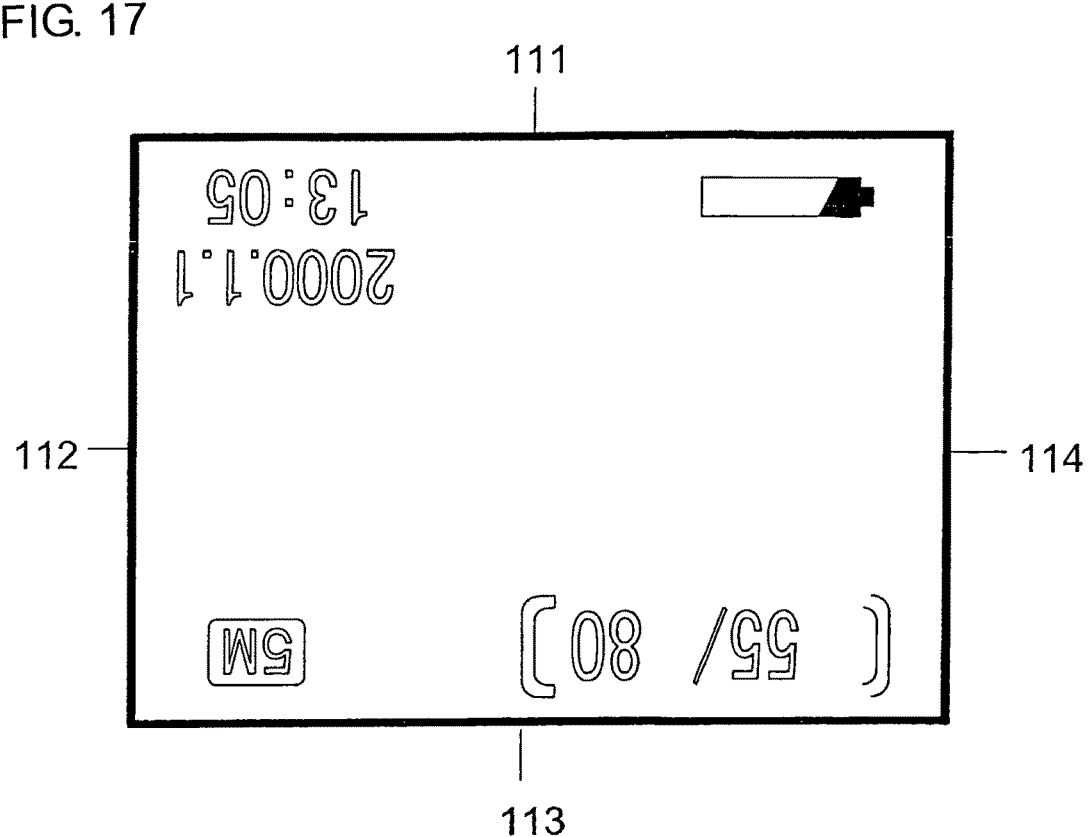
FIG. 17 is a diagram that illustrates an example of the inclination of displayed index information.
Figure 18:
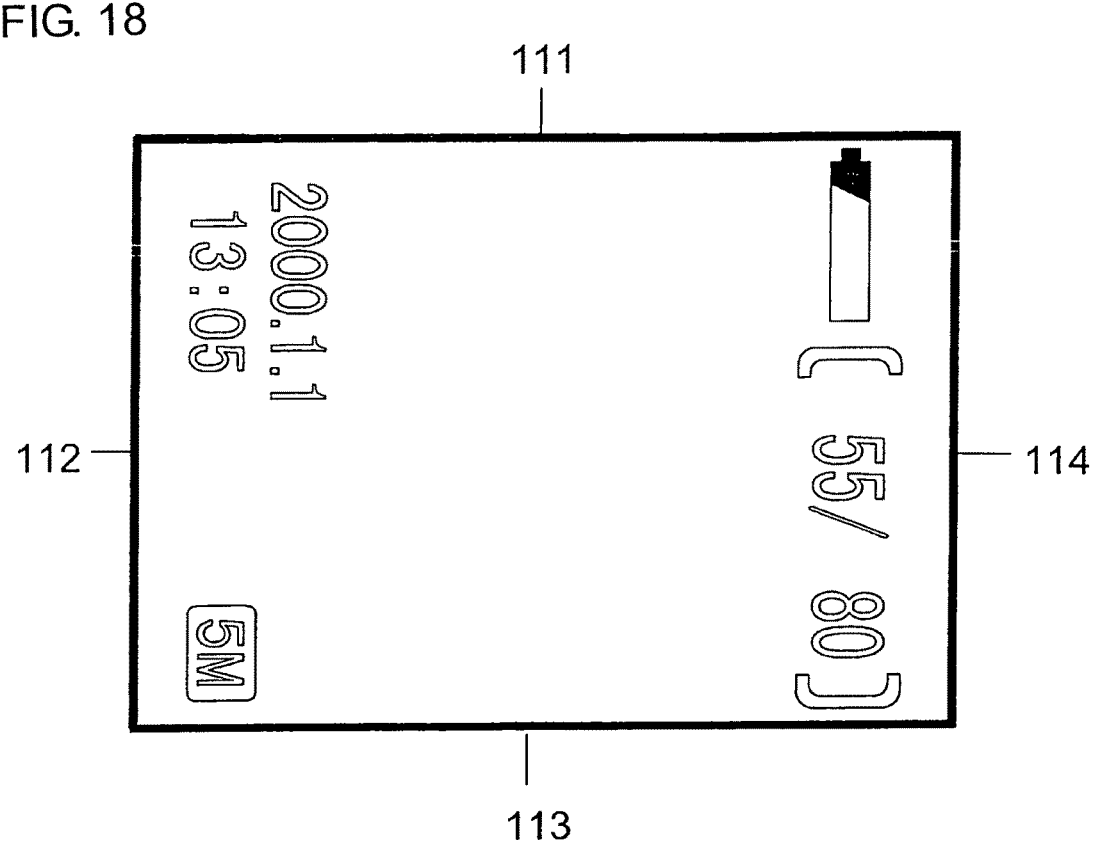
FIG. 18 is a diagram that illustrates an example of the inclination of displayed index information.
Figure 19:
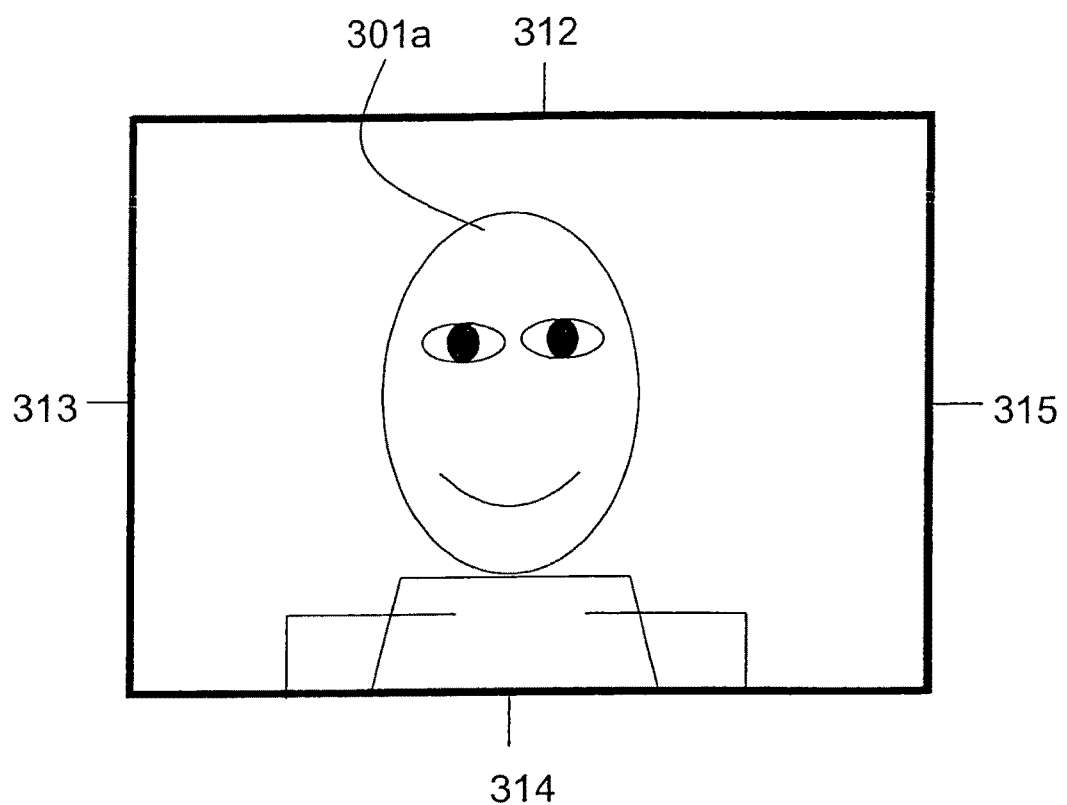
FIG. 19 is a diagram showing an example of the size of a facial image of the viewer.
Figure 20:
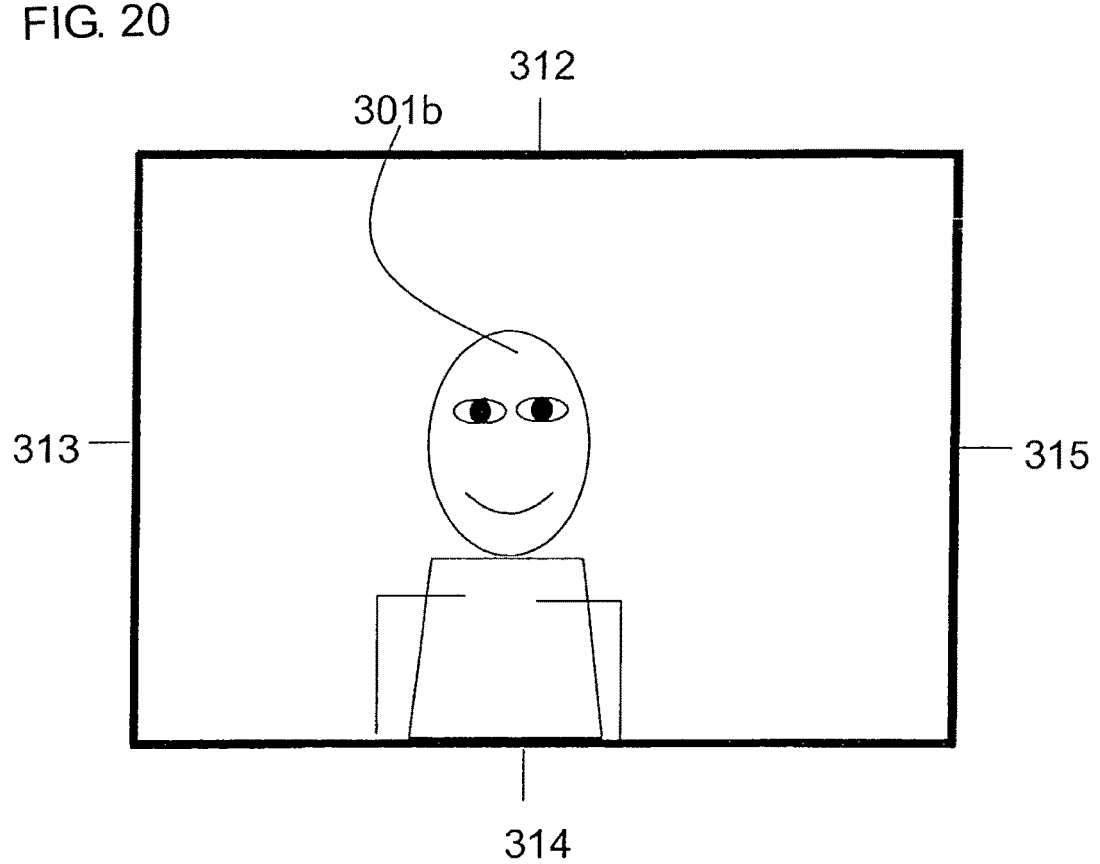
FIG. 20 is a diagram showing an example of the size of a facial image of the viewer.
Figure 21:
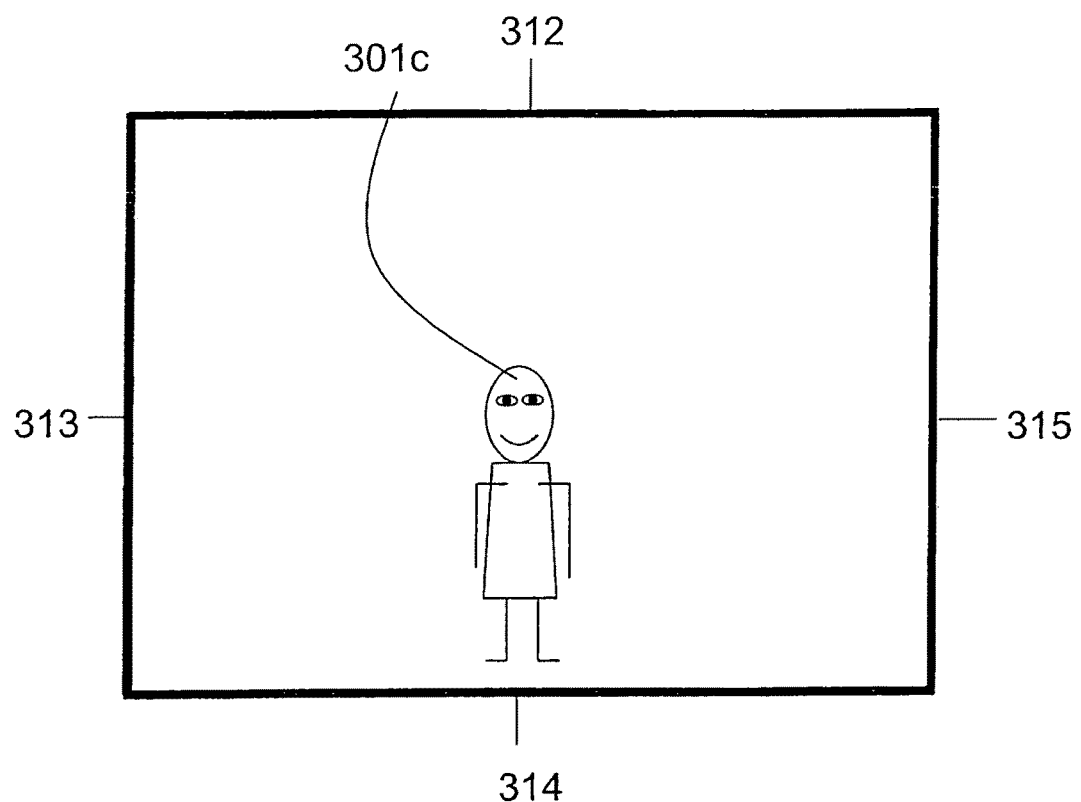
FIG. 21 is a diagram showing an example of the size of a facial image of the viewer.

Therefore, the rotation is not performed by the image processing unit 208 shown in FIG. 15 when the inclination of the facial image 308*a* is as shown in FIG. 11A and FIG. 11B. In the case where the inclination of the facial image of the viewer corresponds to the inclination of the facial image 309*a* as shown in FIG. 12A and FIG. 12B, 270° rotation is given clockwise by the image processing unit 208 with FIG. 15 being assumed to be 0° (standard) as shown in FIG. 16. In the case where the inclination of the facial image of the viewer corresponds to the inclination of the facial image 310*a* as shown in FIG. 13A and FIG. 13B, 180° rotation is given clockwise by the image processing unit 208 with FIG. 15 being assumed to be 0° (standard) as shown in FIG. 17. In the case where the inclination of the facial image of the viewer corresponds to the inclination of the facial image 311*a* as shown in FIG. 14A and FIG. 14B, 90° rotation is given clockwise by the image processing unit 208 with FIG. 15 being assumed to be 0° (standard) as shown in FIG. 18. As mentioned above, in step S310, rotation by only a determined rotation angle is given clockwise by the image processing unit 208 with FIG. 15 being assumed to be 0° (standard). Rotation of the index information by only a rotation angle $\alpha$ clockwise causes the inclination of the facial image to approach an angle at which it can be viewed by the viewer almost in front upright.

A step S311 and subsequent steps relate to display sizes of the index information. In step S311, the image processing unit 208 determines a size L of the facial image of the viewer. The size of the facial image is determined by using a well-known technology. The longer the distance between the digital camera and the viewer (i.e., the smaller the facial image in the image-capturing plane), the poorer is the visibility of the image. For this reason, the image processing unit 208 controls the size of the index information such that the smaller the size of the determined facial image, the larger the displayed index information. When it is determined by the CPU 210 that the size L of the facial image is smaller than a predetermined threshold L1 in step S312, the control proceeds to step S314. In step S314, the image processing unit 208 sets magnification m to m3 and the control shifts to step S317. When it is determined by the CPU 210 that the size L of the facial image is L1≤L≤L2 in step S313, the control proceeds to step S315. In step S315, the image processing unit 208 sets magnification m to m2 and the control shifts to step S317. When it is determined by the CPU 210 that the size L of the facial image is not L1≤L≤L2 in step S313, the control proceeds to step S316. In step S316, the image processing unit 208 sets magnification m to m1 and the control shifts to step S317. In this embodiment, it is assumed that m1, m2, and m3 are m1<m2<m3. In the following description, the display size when the size L of the facial image is larger than L2 is assumed to be a standard size. In a step S317, the image processing unit 208 expands the index information m fold and the control proceeds to step S318.

Figure 22:
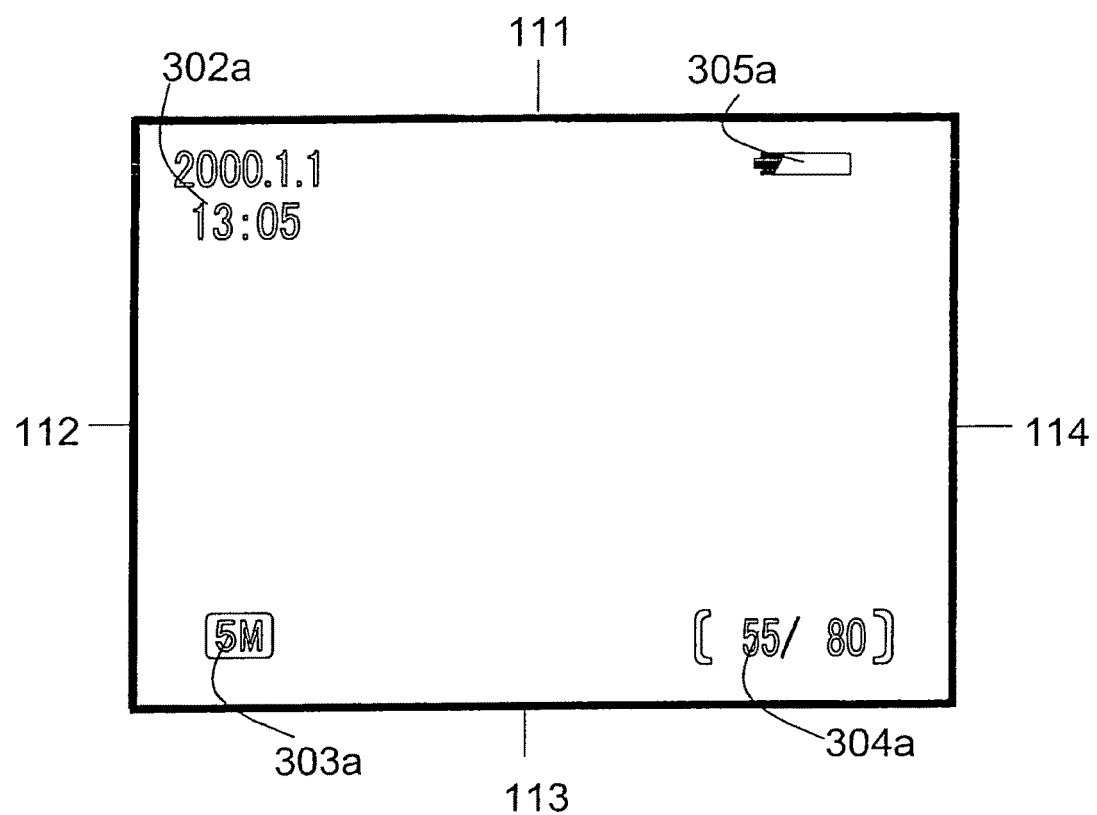
FIG. 22 is a diagram that illustrates an example of the size of displayed index information.
Figure 23:
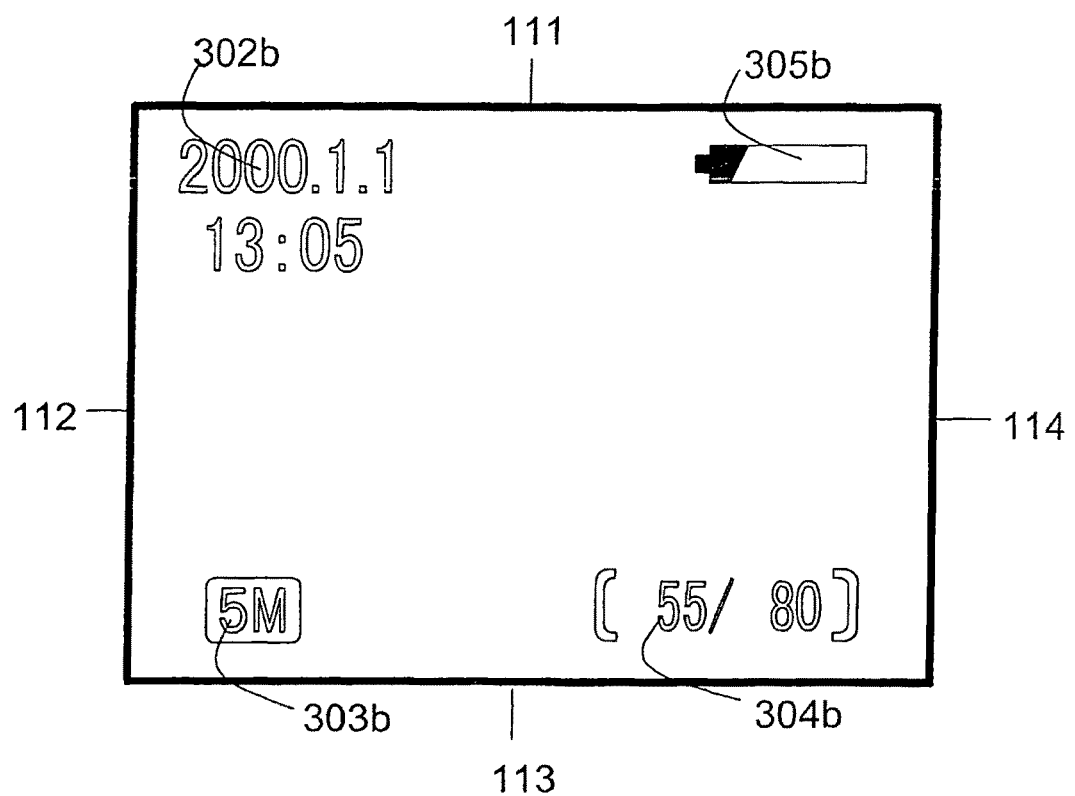
FIG. 23 is a diagram that illustrates an example of the size of displayed index information.
Figure 24:
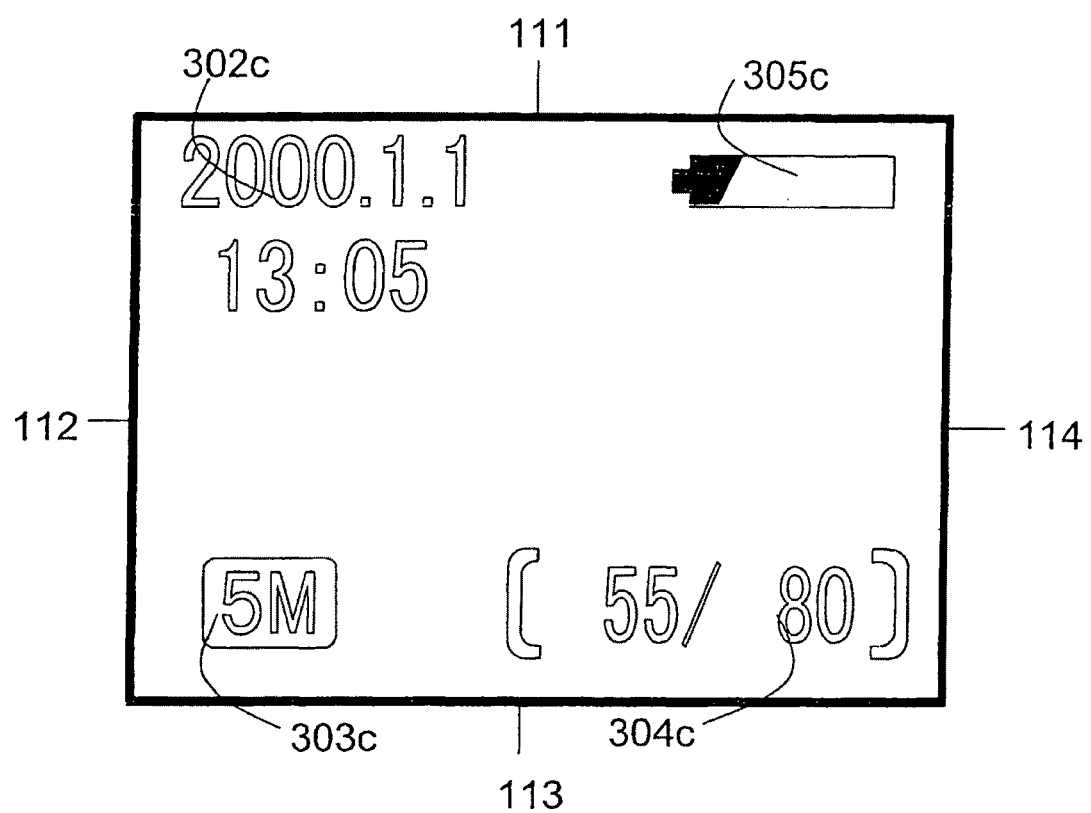
FIG. 24 is a diagram that illustrates an example of the size of displayed index information.
Figure 25:
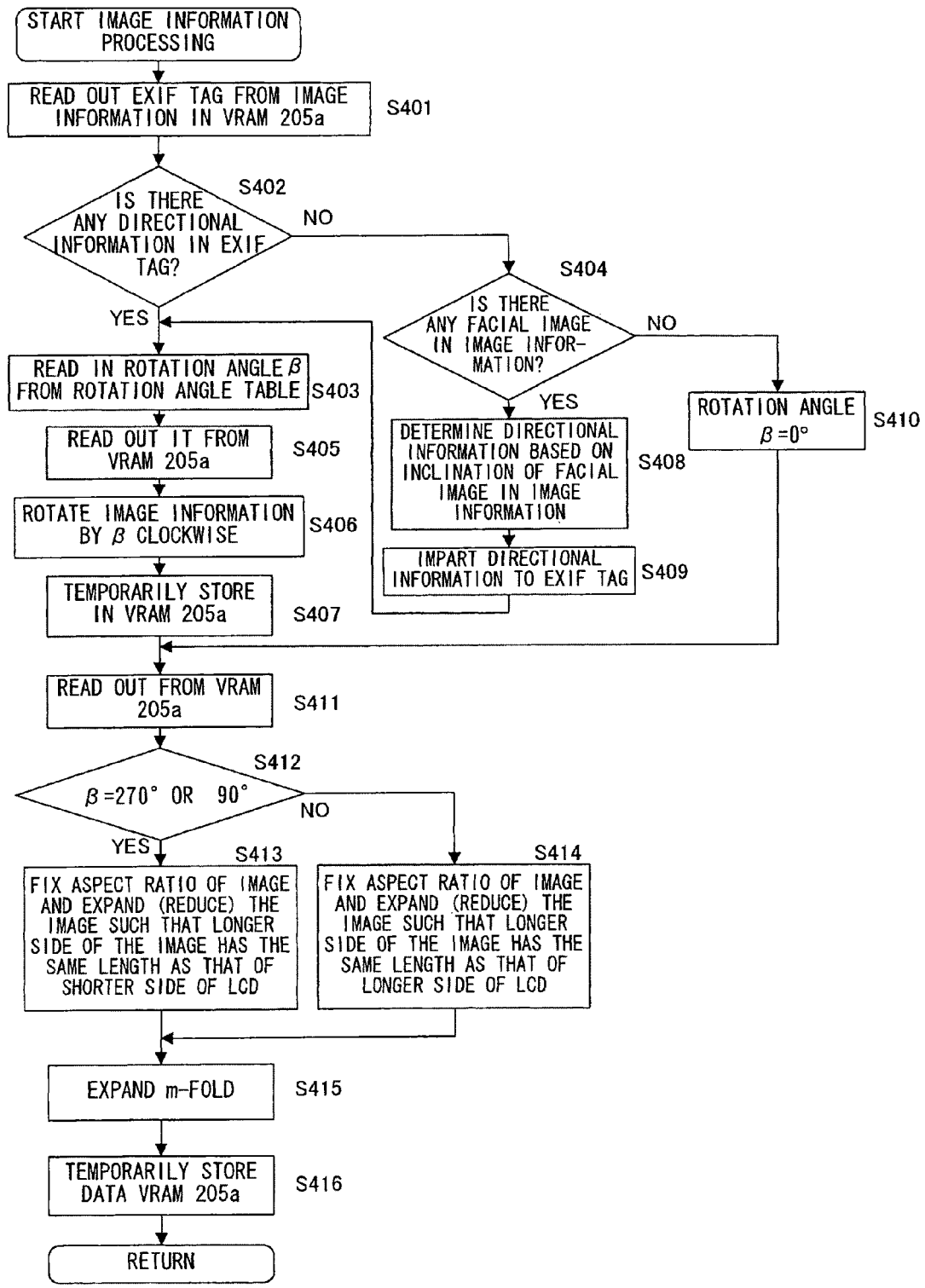
FIG. 25 is a flowchart that illustrates the image information processing.

In this embodiment, the size L of the facial image is obtained based on the ratio of the area of facial image to the area of the captured image area the facial image occupies. The predetermined threshold L1 is assumed to be 4% in the facial image area, and this corresponds to a distance between the digital camera and the viewer of about 50 cm. L2 is assumed to be 10% of the facial image area, and this corresponds to a distance between the digital camera and the viewer of about 30 cm. The dimensions of the size of the facial image of the viewer and of the size of the index information are described with reference to FIG. 19-FIG. 21 and FIG. 22-FIG. 24. Facial images 301a-301c are facial images of the viewer captured through the photographic lens 106. In the case of the facial image 301a, the facial image area occupies about 20% of the captured image area and the size L of the facial image is shown larger than the predetermined size L2. In the case of the facial image 301c, the facial image area occupies about 2% of the captured image area and the size L of the facial image is shown smaller than the threshold L1. In the case of the facial image 301b, the facial image area occupies about 8% of the captured image area. Thus, the size L of the facial image is L1≤L≤L2. Moreover, 302a, 302b, 302c, 303a, 303b, 303c, 304a, 304b, 304c, 305a, 305b, and 305c shown in FIG. 22, FIG. 23, and FIG. 24 are pieces of index information displayed in the replay mode. 302a, 302b, and 302c indicate date and time (year, month, time and minute) of shooting. 303a, 303b, and 303c indicate numbers of set pixels at the time of shooting. 304a, 304b, and 304c orders of images currently displayed/total number of image frames. 305a, 305b, and 305c indicate residual quantity of the battery.

The present invention will be explained taking an example of the index information displayed in the replay mode. In the case of the facial image 301a shown in FIG. 19, the distance from which the viewer visually checks the LCD 105 is near enough. Therefore, the viewer can visually check the index information displayed in a standard size like 302a-305a shown in FIG. 22, so that the image processing unit 208 does not expand the index information. In other words, in this case, m1 is one fold in this embodiment. In the case of the facial image 301b shown in FIG. 20, that is, the viewer is located at a slightly remote position, the image processing unit 208 processes the index information such that the index information is displayed in a larger size like 302b-305b compared with 302a-305a shown in FIG. 23. In this case, the magnification m is set to m2=1.5 in this embodiment and the index information is displayed as expanded to 1.5 fold in length and breadth. In the case of the facial image 301c shown in FIG. 21, that is, the viewer is located at a still remoter position, the image processing unit 208 processes the index information such that the index information is displayed in a still larger size like 302c-305c shown in FIG. 24 as compared with 302b-305b. In this case, the magnification m is set to m3=2 in this embodiment and the index information is displayed as expanded to 2 fold in length and breadth. In step S318, the processed index information is once accumulated in the OSD area 205b by the CPU 210. When plural facial images are detected, the image processing unit 208 performs the above-mentioned processing based on the facial image of the person who is the nearest to the center point of the image-capturing area.

6. Processing of Image Information

Subsequently, the processing of the index information will be described with reference to the flowchart shown in FIG. 25 and FIGS. 26 through 33. Rotation processing of image information is processing in which taking into consideration directional information of the image, the direction of an image is made to approach a direction along which the image information is positioned upright in front of the facial image of the viewer. The directional information of the image can be imparted to a Tag information on Exchangeable image file format (hereafter, "Exif"), which is a file type of image widely used. The CPU 210 determines the direction of display by reading out the directional information in the Exif Tag in this processing. In step S401, the CPU 210 reads out the Exif Tag information stored in the VRAM area 205a and the control proceeds to step S402. In step S402, it is determined by the CPU 210 whether there is directional information in the Exif Tag in the image information.

If there is directional information, the control proceeds to step S403. If there is no directional information, the control proceeds to step S404. In step S403, rotation is performed in consideration of the directional information in addition to the direction of the facial image of the viewer. Therefore, the rotation angle is determined by the CPU 210 based on the combination of the quadrant in which the face direction vector is present with the image orientation. In step S403, rotation angle β is read in from the table shown in FIG. 26 and the control proceeds to step S405. In step S405, the CPU 210 reads in the image information saved in the VRAM region 205a and the control proceeds to step S406. In step S406, the image processing unit 208 rotates the read-in image information by only the rotation angle β clockwise and the control proceeds to step S407. In step S407, the image information is once saved by the CPU 210 in the VRAM area 205a and the control proceeds to step S411.

Figure 27:
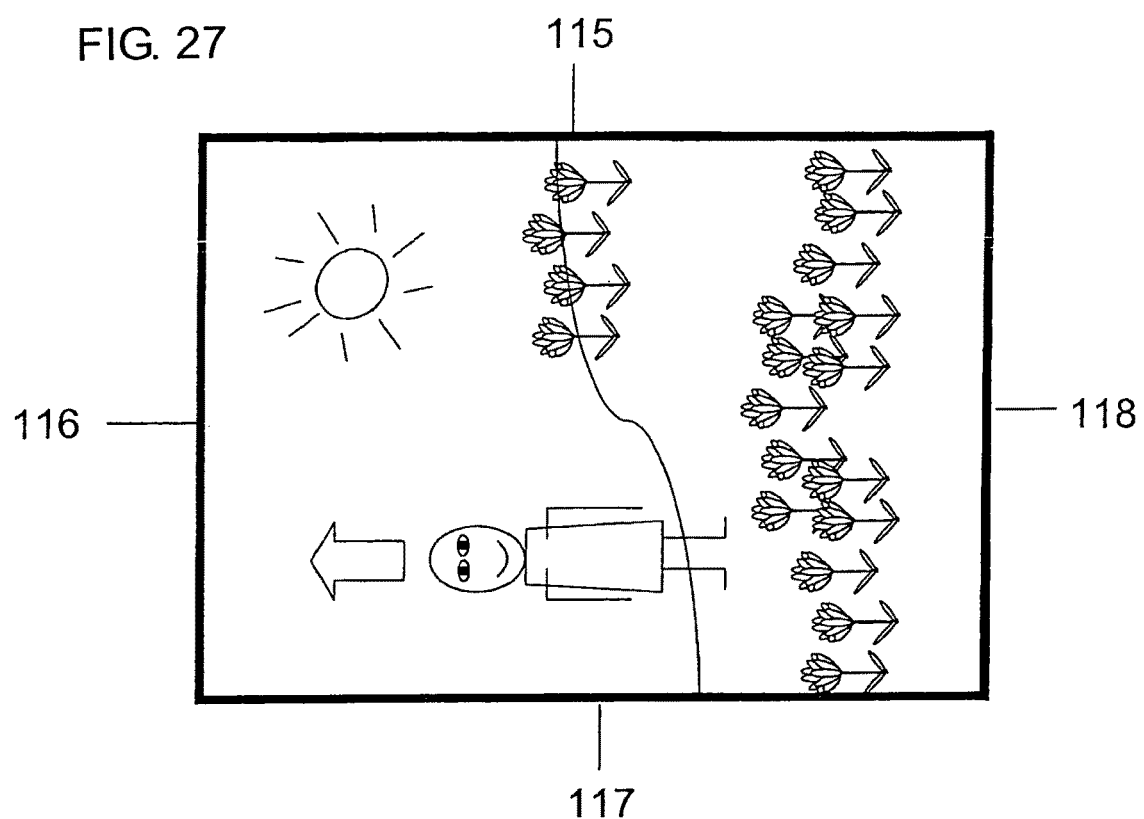
FIG. 27 is a diagram illustrating processing that determines direction information on an image based on the image information and the facial image in the image information.
Figure 28:
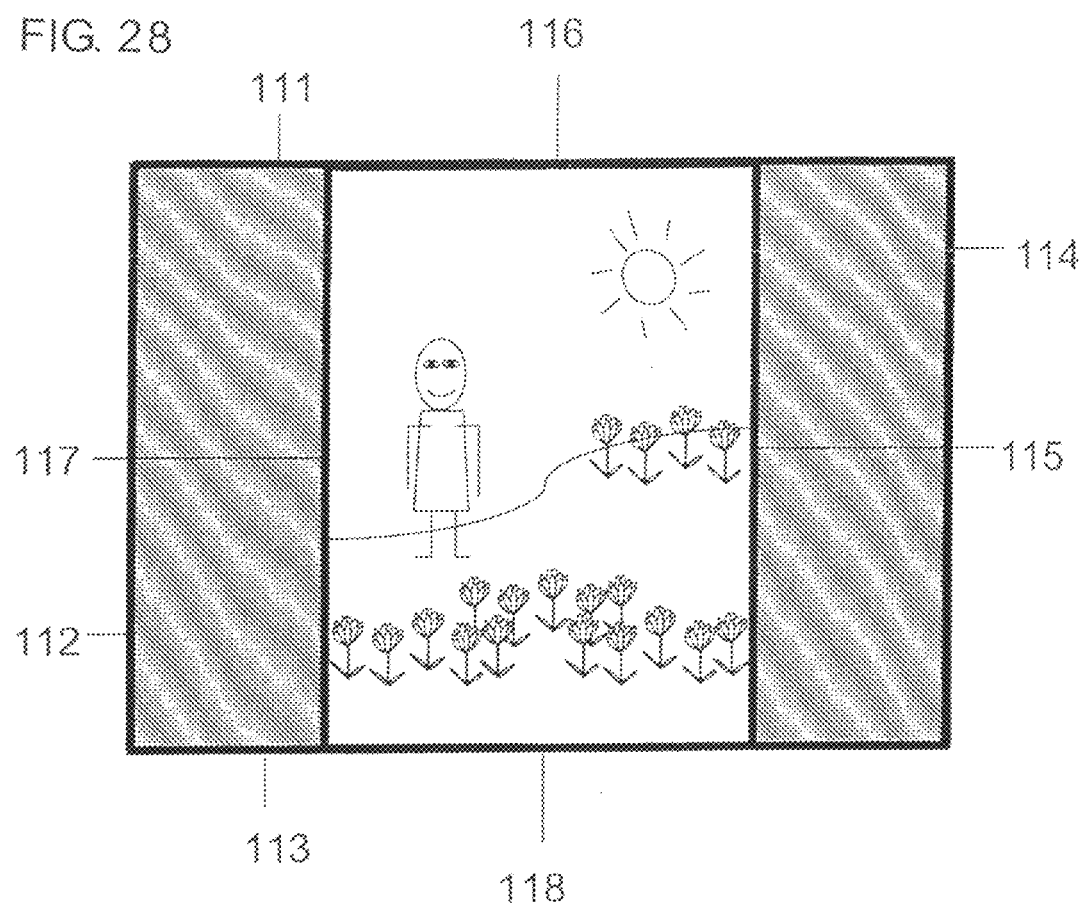
FIG. 28 is a diagram that illustrates an example of a display in which the image information shown in FIG. 27 is displayed as being rotated.

On the other hand, in the case where there is a facial image in the image information that contains no directional information, the image processing unit 208 determines the direction vector of the facial image in the image information, and determines that the side to which the vector is directed is an upper side as shown in FIG. 27. In step S404, the image processing unit 208 determines whether there is a facial image in the facial image. If there is a facial image in the image information, the control proceeds to step S408. In step S408, the image processing unit 208 determines a face direction vector from the facial image of a person in the image information and determines directional information of the image information. When there are plural facial images, the image processing unit 208 determines the direction based on the facial image nearest to the center point of the image-capturing area. In step S409, the CPU 210 imparts the Exif Tag with the above-mentioned directional information. In the case of the image information shown in FIG. 27, the side 116 is determined to be the upper side. In step S409, if the directional information is imparted to the Exif Tag in the image information, the control shifts to step S403. In step S404, when it is determined by the image processing unit 208 that there is no facial image in the image information, the control proceeds to step S410. In step S410, the CPU 210 sets the rotation angle β to 0° and the control proceeds to step S411.

Step S411 and subsequent steps are steps of expansion processing of the image information. In step S411, the CPU 210 reads out the image information from the VRAM area 205a and the control proceeds to step S412. In step S412, the CPU 210 determines whether the rotation angle β is 270° or 90°. If β is 270° or 90°, the control proceeds to step S413 and the image processing unit 208 processes the image information to a standard size. In the case of standard size, the shorter side of the LCD 105 and the longer side of the image information have the same lengths, and the processing is given like the image shown in FIG. 28. In step S413, the image processing unit 208 processes the image information by fixing the aspect ratio of the image information such that the longer side of the image information and the shorter side of the LCD 105 have the same lengths. Then, the control proceeds to step S415.

Figure 29:
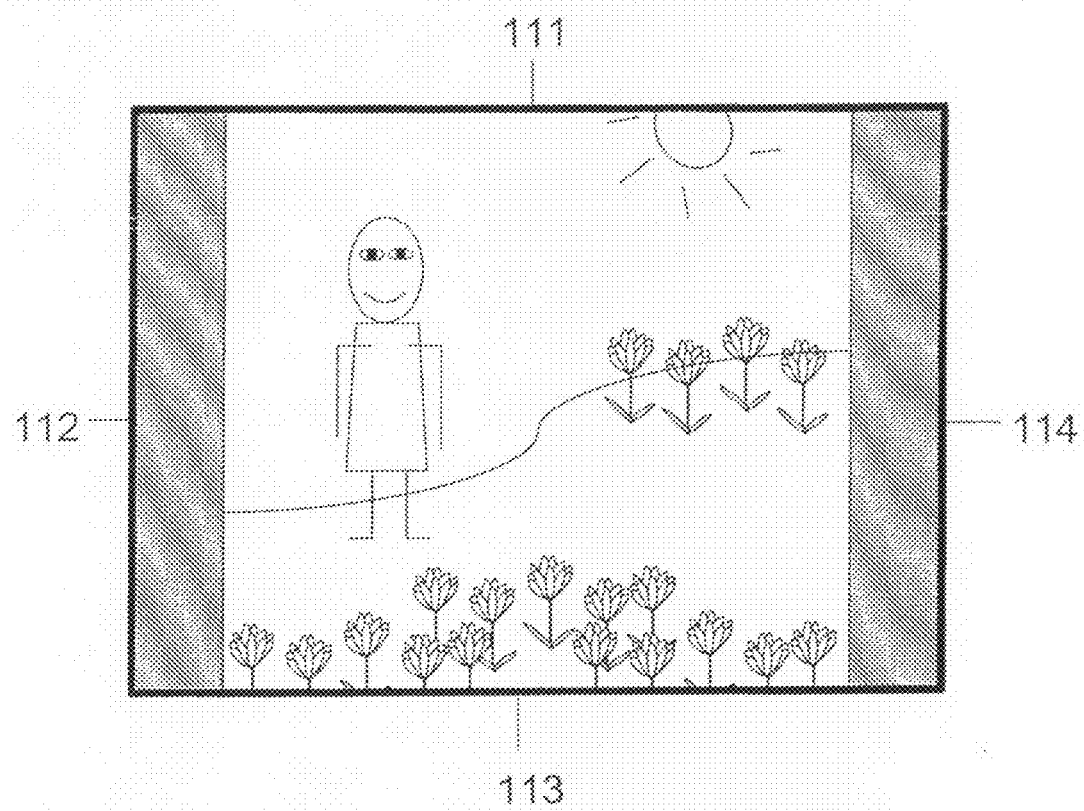
FIG. 29 is a diagram that illustrates an example of a display in which the image information shown in FIG. 27 is displayed as rotated.
Figure 30:
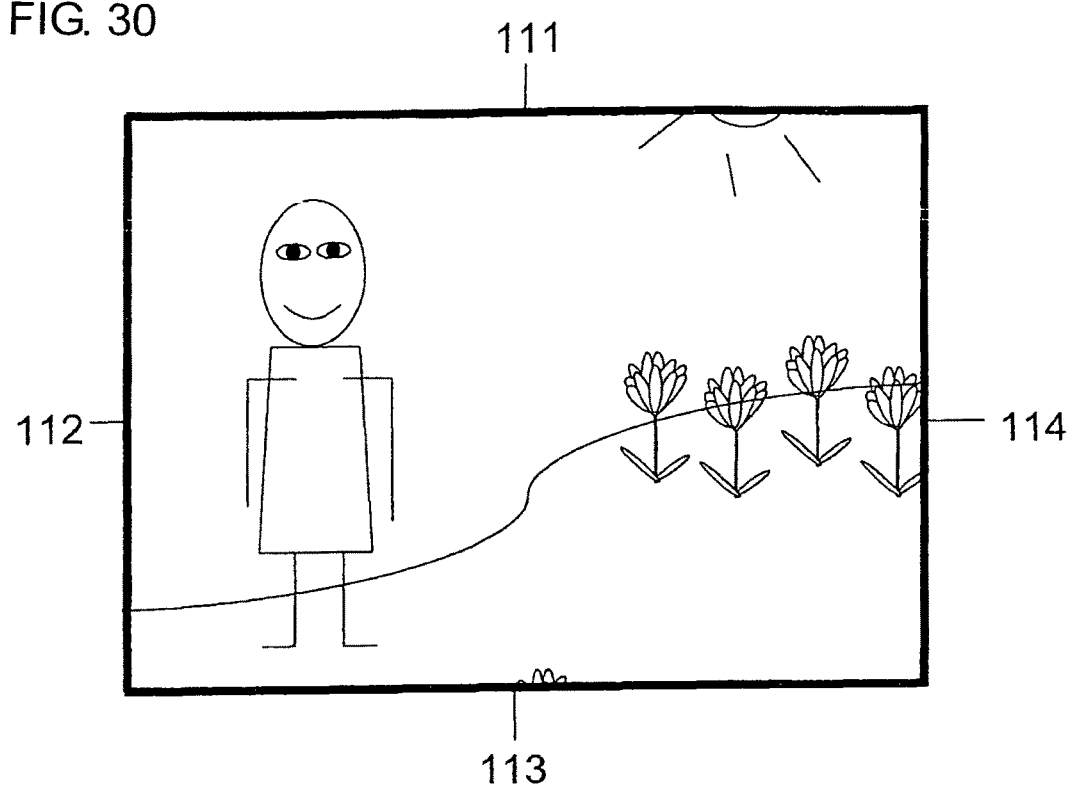
FIG. 30 is a diagram that illustrates an example of a display in which the image information shown in FIG. 27 is displayed as being rotated.
Figure 31:
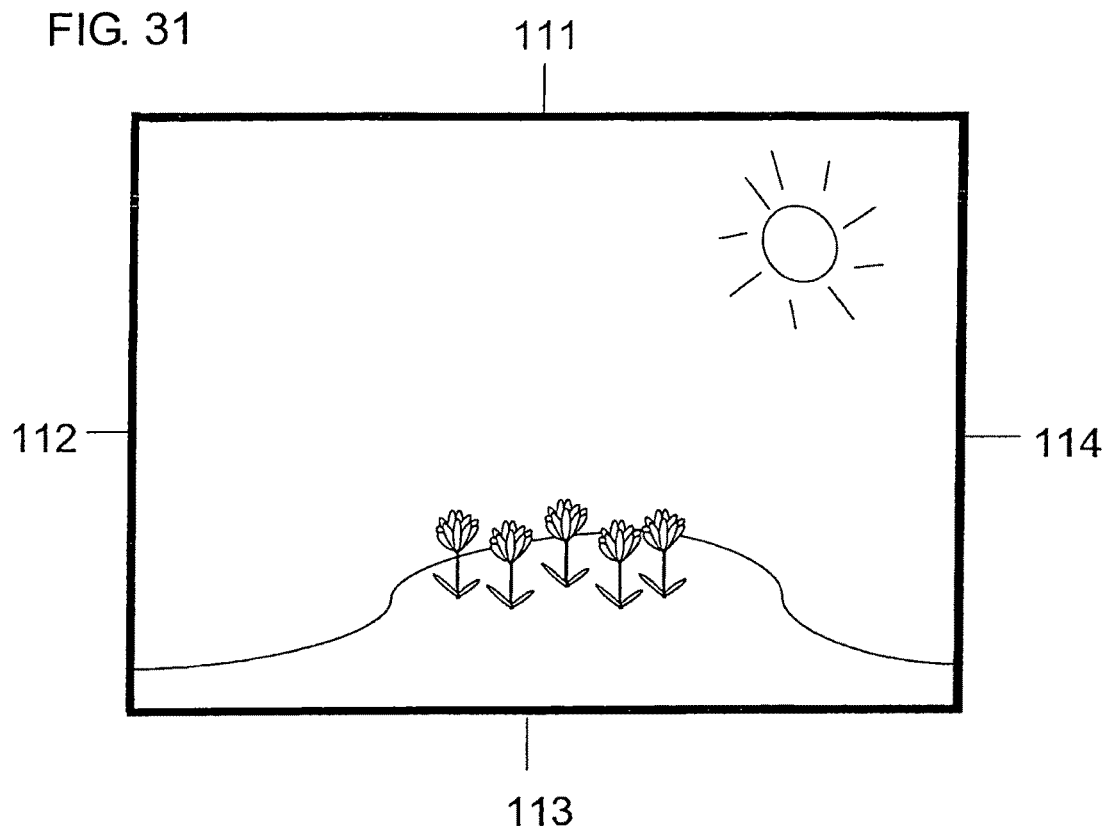
FIG. 31 is a diagram that illustrates an example of the size of a display of image information.
Figure 32:
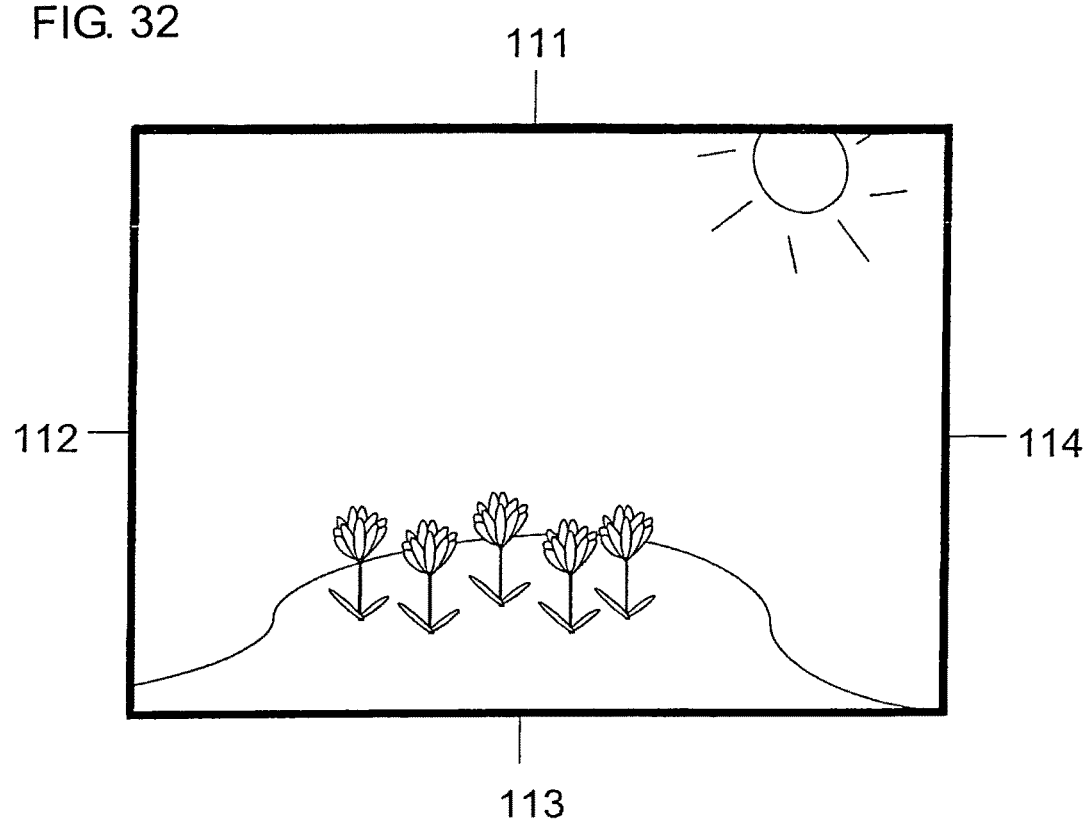
FIG. 32 is diagram that shows an example of the size of displayed image information.
Figure 33:
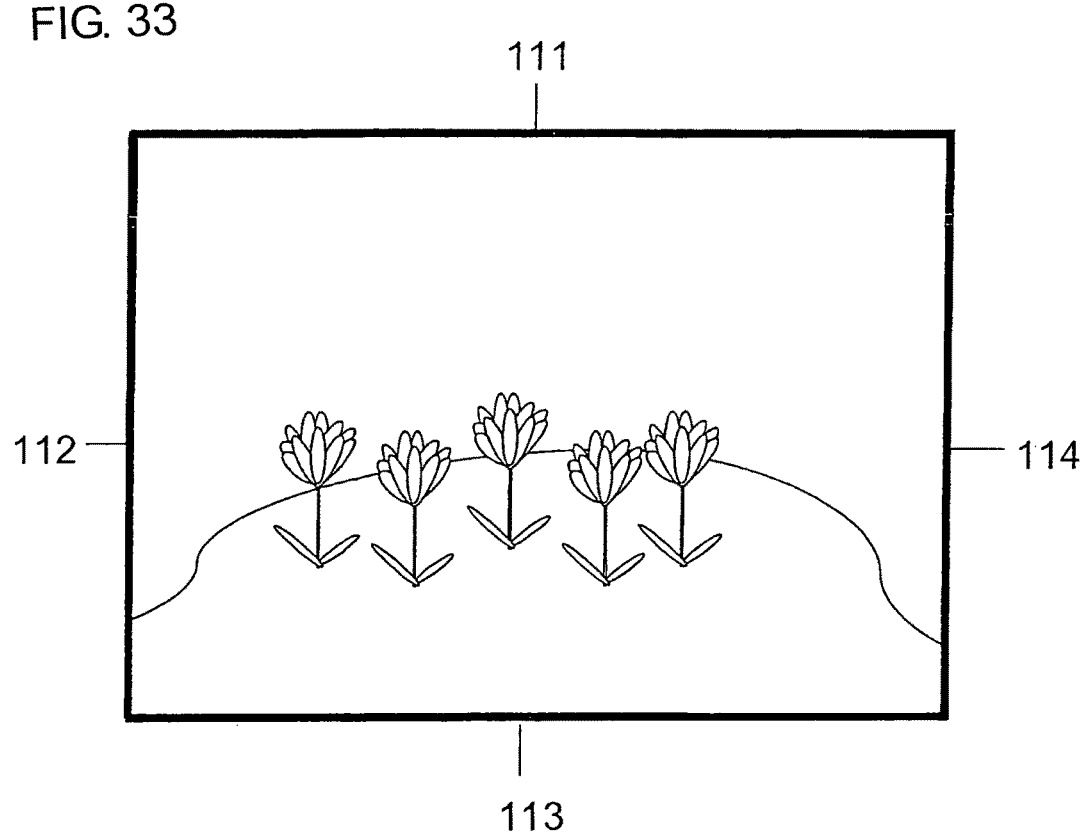
FIG. 33 is a diagram that illustrates an example of the size of displayed image information.

On the other hand, the control proceeds to step S414 if the rotation angle β is other than 270° or 90° (i.e., in the case of β=0° or 180°), and the image processing unit 208 processes the image information to a standard size. In the case of the standard size, the longer side of the LCD 105 and the longer side of the image information have the same lengths and the image processing unit 208 processes the image information to a size such that the longer side of the image information and the longer side of the LCD 105 have the same lengths with fixing the aspect ratio in step S414. Next, in step S415, the image processing unit 208 expands the image information such that it may become m fold. For the magnification m, the same value as that of m set in the index information processing is used. The image obtained by processing the image of FIG. 28 to 1.5 fold is displayed as shown in FIG. 29, and the image expanded two fold is displayed as shown in FIG. 30. On the other hand, the image obtained by processing the image of FIG. 31 to 1.5 fold is displayed as shown in FIG. 32, and the image expanded 2 fold is displayed as shown in FIG. 33. Subsequently, in step S416, the processed image information is accumulated in the VRAM area 205a again by the CPU 210 and the control returns to the main loop. In the replay mode, the image information of which replay is instructed by the user (viewer) is read out from the recording medium by the CPU 210 beforehand, and is temporarily stored to the VRAM area 205a.

7. Plural Faces Recognition Processing

Figure 34:
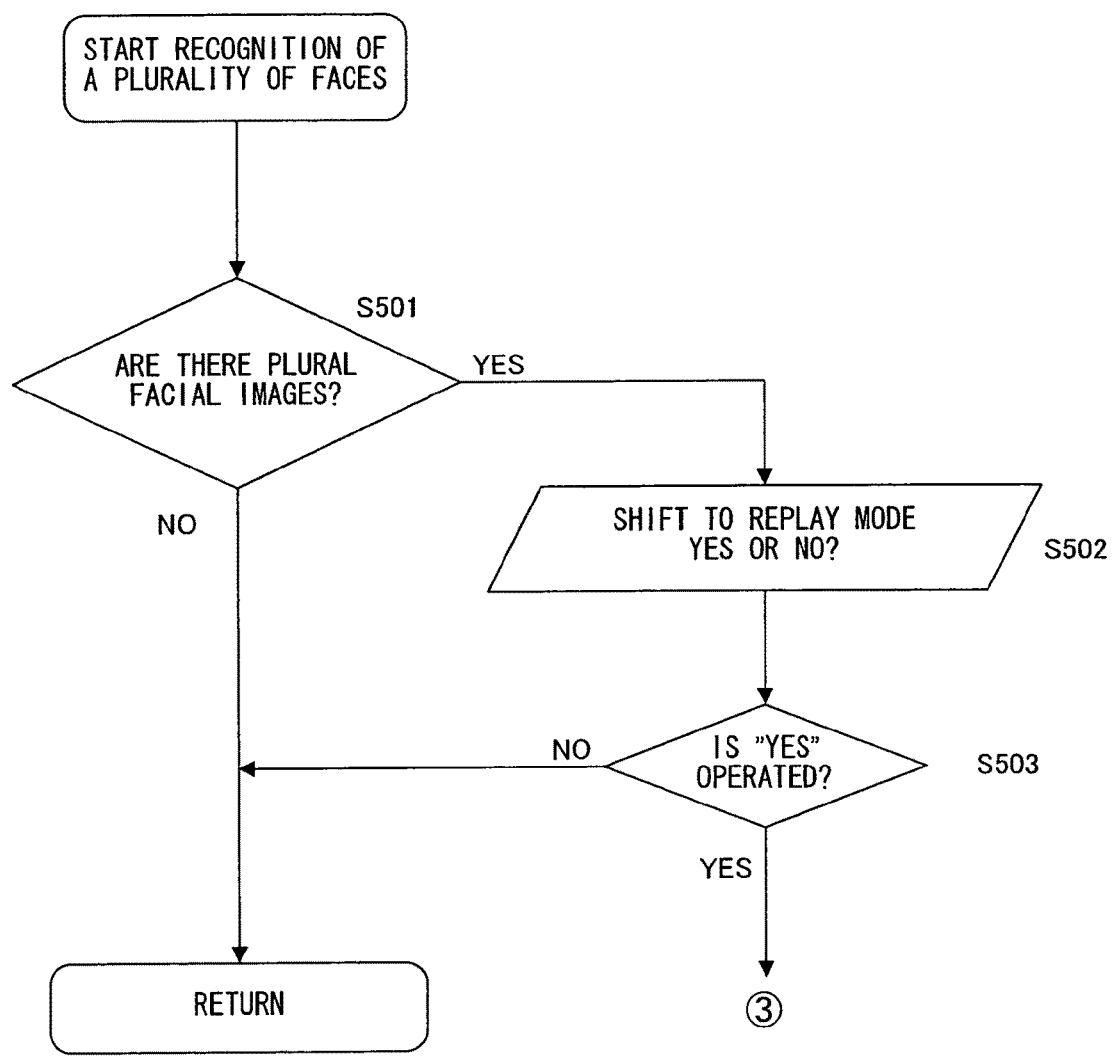
FIG. 34 is a flowchart that illustrates processing in which a plurality of faces is recognized.

Processing for recognizing plural faces (hereafter, referred to as "plural faces recognition processing") is now explained in reference to the flowchart presented in FIG. 34. In step S501, it is determined by the image processing unit 208 whether there is a plurality of facial images of viewers captured by the image sensor 202. When there is a plurality of facial images, the control proceeds to step S502 whereas when there are no plural images, the control returns to the main loop. In step S502, the display control unit 211 displays a message to ask whether to shift to the replay mode in the LCD 105, and the control proceeds to step S503. In step S503, the input from the user is accepted. If it is "YES", the control proceeds to step S1 shown in FIG. 7 in order to shift to the replay mode. If it is "NO", the control returns to the main loop.

According to the first embodiment as described above, the following advantages are obtained.

(1) The image processing unit 208 is adapted to recognize the facial image of a viewer (observer) looking into the LCD 105 based on the image signal output from the image sensor 202, and determines a rotation angle abased on an angle of the face direction vector to the reference vector, that is, the inclination of the facial image. As a result, the index information on which the rotation processing is performed by only the rotation angle α is displayed, that is, the index information is displayed so as to confront the viewer almost in front and upright in the LCD 105 based on the inclination of the facial image. Therefore, the visibility of the index information by the viewer can be improved.

(2) The CPU 210 is adapted to determine whether directional information is included in Exif Tag in the image information and determines the rotation angle β based on the inclination of the facial image and the directional information when the directional information is included. As a result, the image on which the rotation processing is performed by only the rotation angle β is displayed in the LCD 105, and the vertical direction of the LCD 105 as seen by the viewer and the vertical direction of the displayed image information agrees with each other. Therefore, the visibility of the image information to the viewer can be improved.

(3) The image processing unit 208 processes the image information to a standard size so that the shorter side of the LCD 105 and the longer side of the image information may have the same lengths when the rotation angle β is 270° or 90°. In addition, the image processing unit 208 processes the image information to a standard size so that the longer side of the LCD 105 and the shorter side of the image information may have the same lengths when the rotation angle β is 0° or 180°. That is, since the image processing unit 208 determines a standard display size of the image information based on the inclination of the facial image to the image-capturing plane and the directional information, the image information to be easily seen by the viewer can be obtained by the automatic operation.

(4) The image processing unit 208 is adapted to determine the directional information such that the orientation of direction vector of the facial image is found to be toward the upper side of the image information when the direction vector of the facial image in the image information is determined in case the image information does-not contain the directional information. Therefore, the vertical direction of the LCD 105 to the viewer and the vertical direction of the displayed image can be matched even if the directional information is not contained in the image information and the image information that is easily seen by the viewer can be obtained by the automatic operation, so that convenience improves.

(5) The image processing unit 208 is adapted to determine whether there are plural facial images of viewers captured by the image sensor 202 in the shooting mode and in the menu mode. The display control unit 211 is adapted to display a message to ask whether to switch to the replay mode in the LCD 105 when it is determined by the image processing unit 208 that there are plural facial images. Therefore, when plural facial images are detected, convenience can be improved by inviting the viewer to switch the operation mode to the replay mode since it is highly possible that the image is viewed by plural persons in the replay mode.

(6) The image processing unit 208 is adapted to determine the size L of the detected facial image and change the size of index information based on the size L of the facial image. That is, the image processing unit 208 is adapted to set the magnification of index information to m3 when the size L of the facial image is smaller than the threshold L1 and to m1 when the size L of the facial image is greater than the threshold L2. As a result, the expansion processing or the reduction processing is performed to the index information such that the smaller the size of the facial image, that is, the larger the distance between the viewer and the LCD 105, the greater the index information that can be displayed. Accordingly, it is possible to make it easy to grasp the content of the index information by increasing the visibility of the index information.

Second Embodiment

A different point of this embodiment from the first embodiment is in that a step of the elongation of the index information is added to the latter part of the step of the processing of the index information. This embodiment is practiced with a lens with which an image within the range of θ being about 180° as shown in FIG. 4 can be captured.

Figure 35:
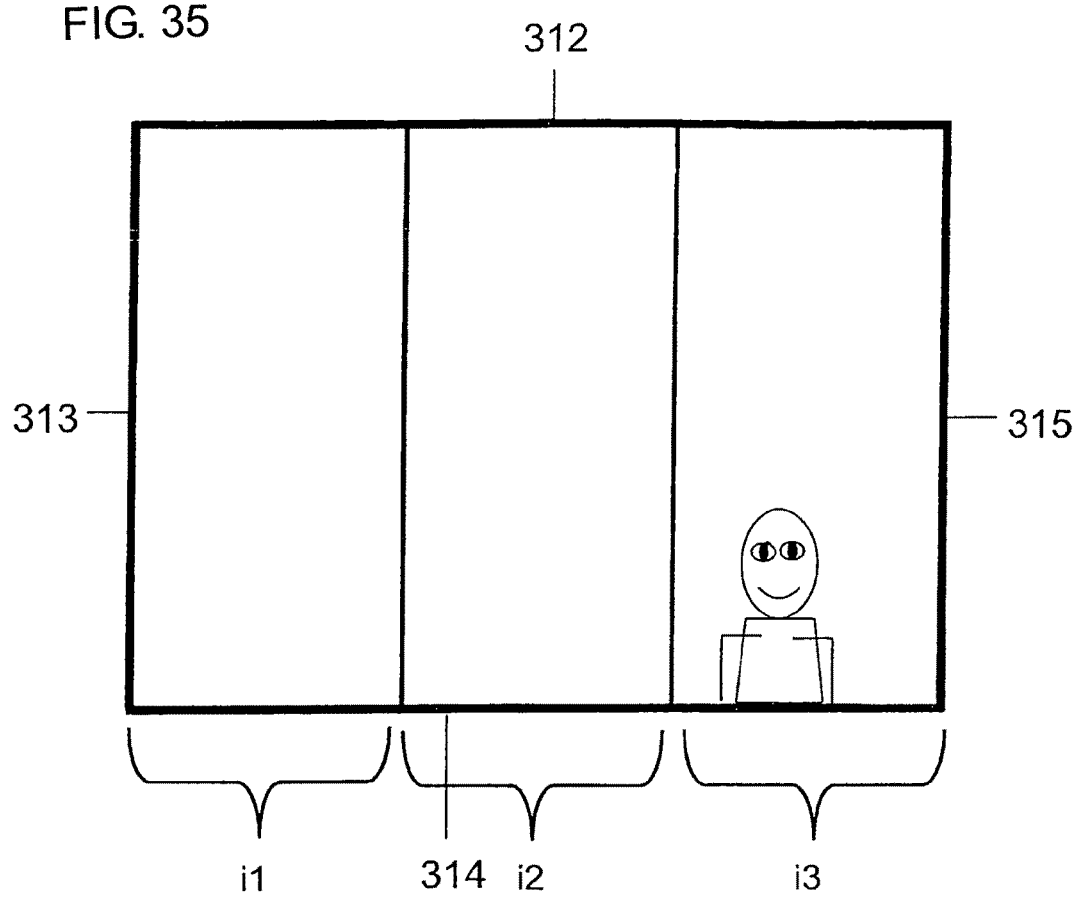
FIG. 35 is a diagram showing a position at which the facial image is captured.
Figure 36:
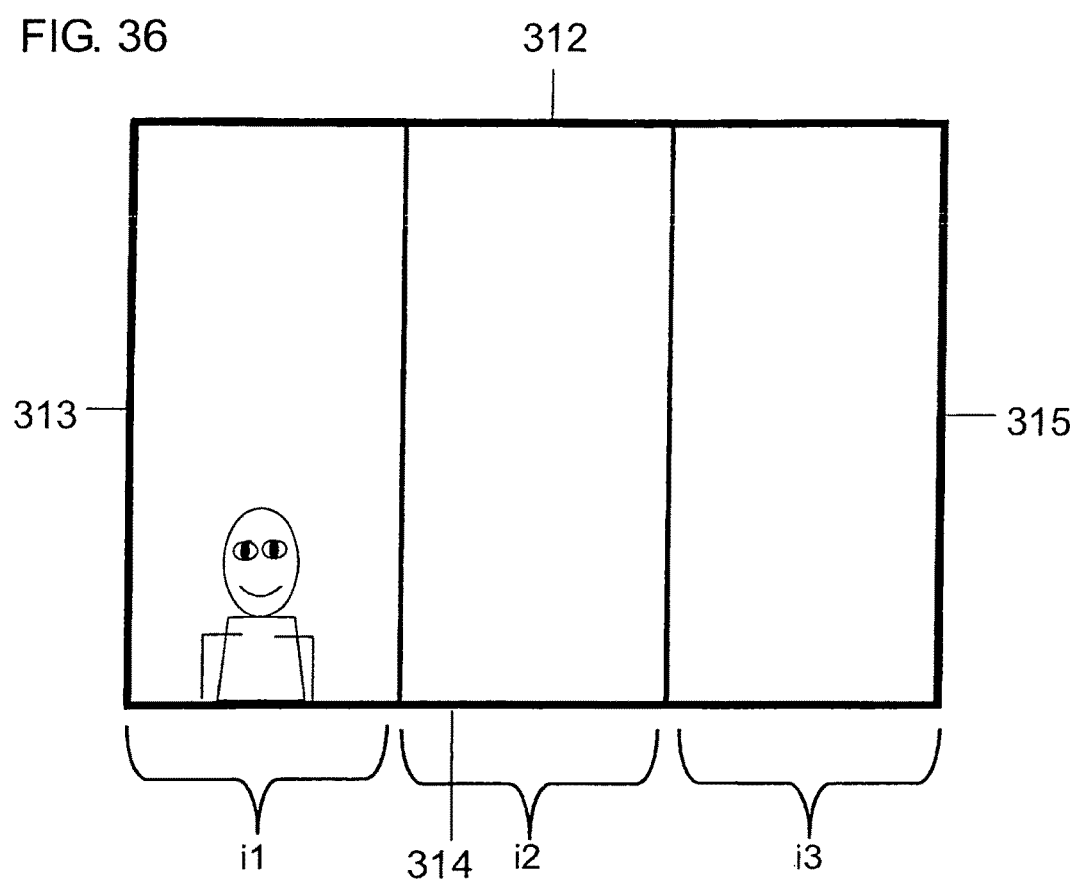
FIG. 36 is a diagram showing a position at which the facial image is captured.
Figure 37:
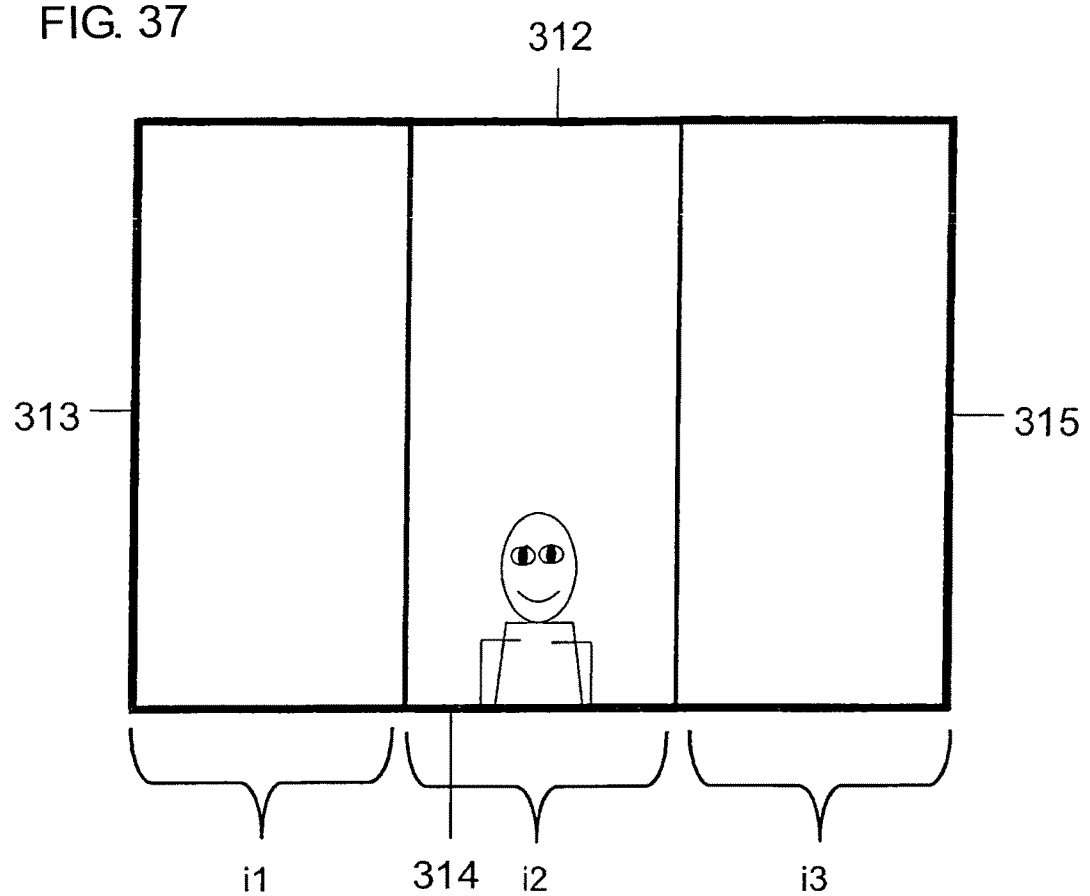
FIG. 37 is a diagram showing a position at which the facial image is captured.
Figure 38:
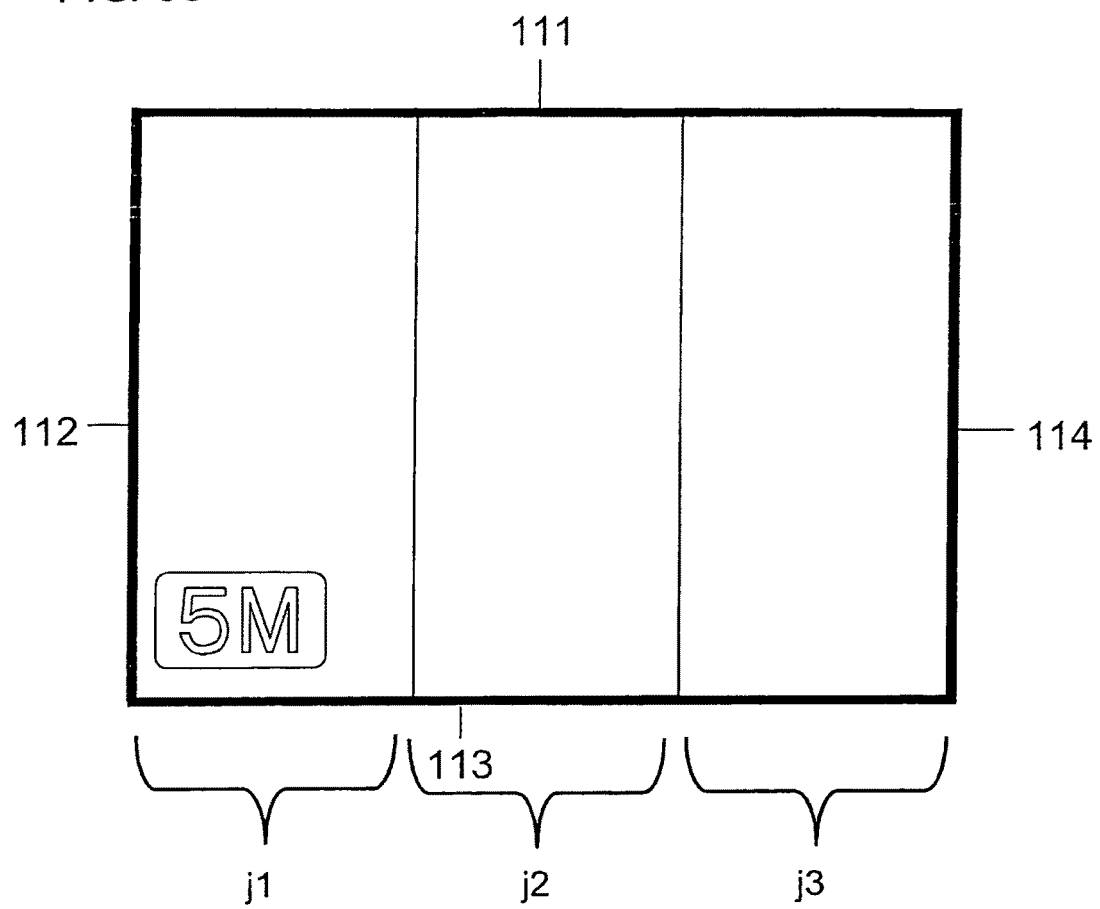
FIG. 38 is a diagram that illustrates the form of a display of index information.
Figure 39:
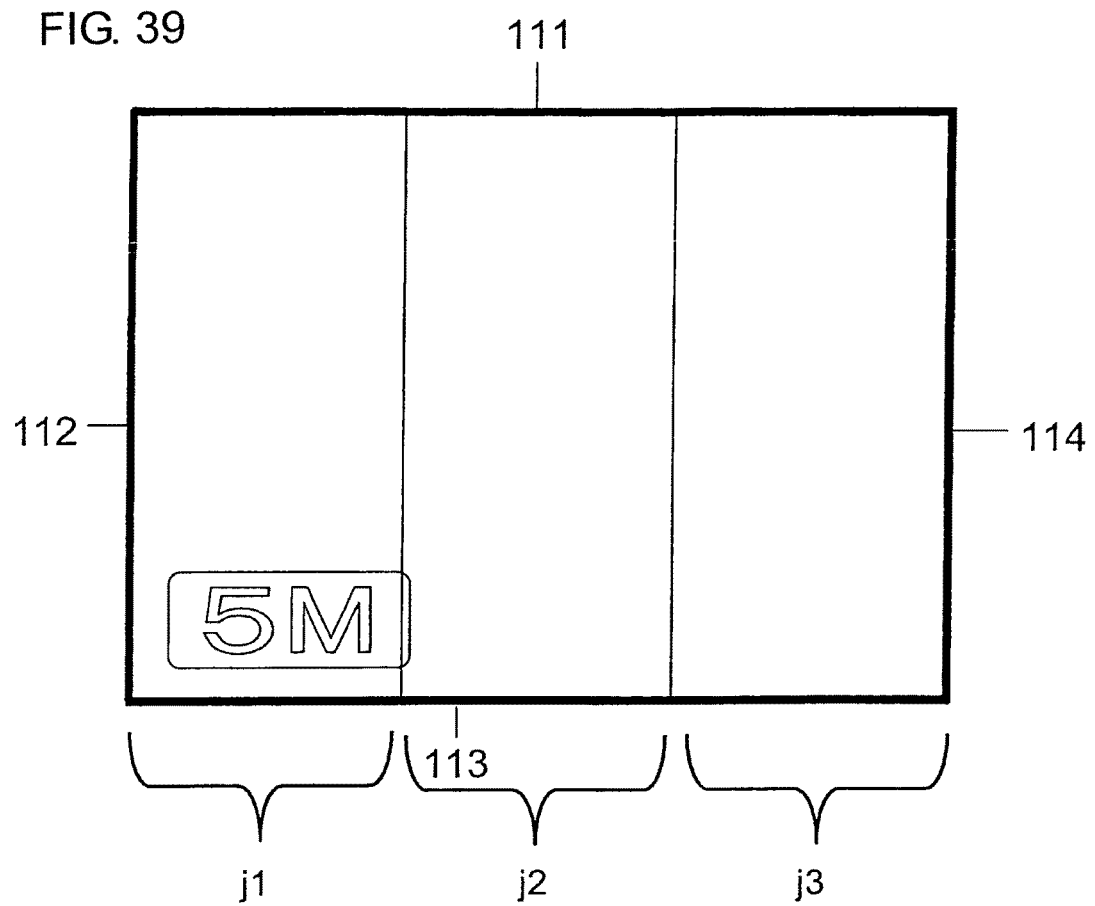
FIG. 39 is a diagram that illustrates an example of the inclination of a display of index information.
Figure 40:
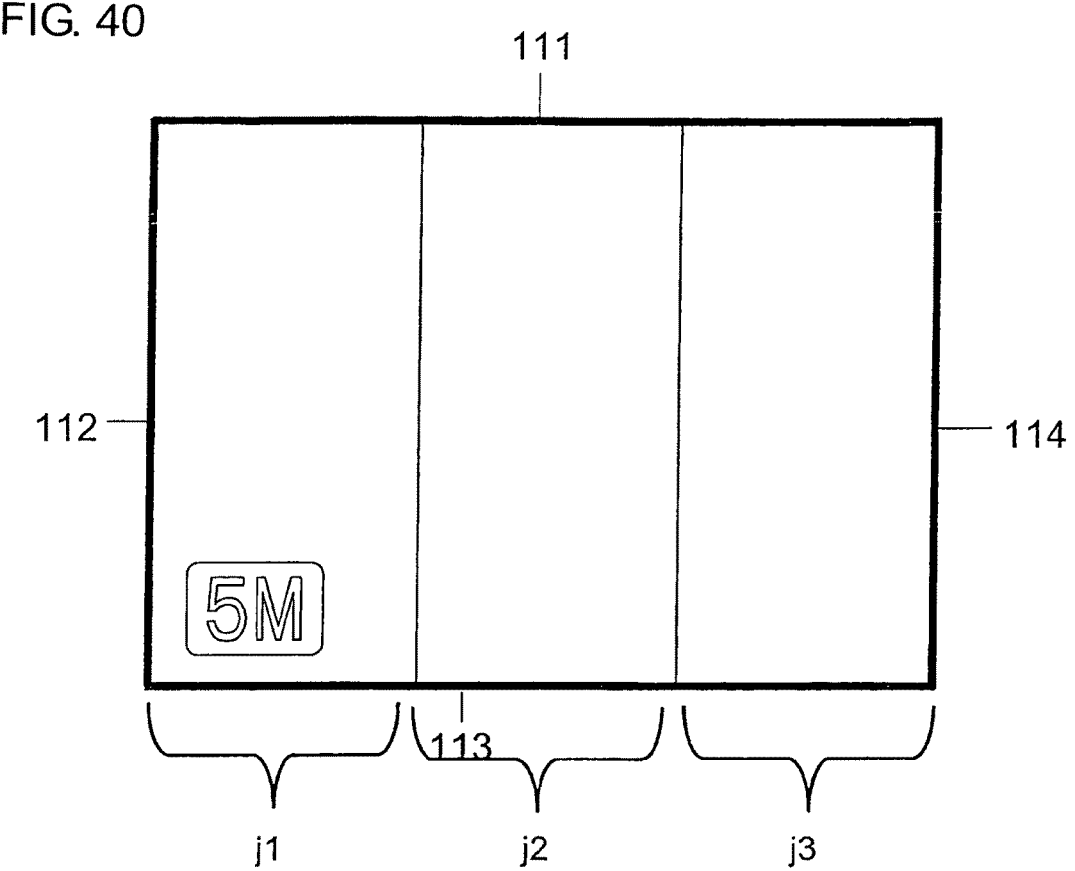
FIG. 40 is a diagram that illustrates the form of displayed index information.

FIGS. 35, 36, and 37 show areas of which images have been captured by using the photographic lens 106. The image-capturing area of each of FIGS. 35, 36, and 37 is laterally divided into three sub-areas. The sub-areas are named area i1, area i2, and area i3, respectively. When the viewer who exists in area i1 or i3 looks at (observe) the display screen, the visibility can be improved by displaying the index information horizontally elongated by the image processing unit 208. The display area of the LCD 105 is also divided into three sub-areas and the sub-areas are named area j1, area j2, and area j3, respectively, as shown in FIGS. 38, 39, and 40. The image processing unit 208 processes the index information at different elongation ratios depending on whether it exists in the area i1 or the area i3 so that the index information remoter from the viewer can be elongated more. When the viewer is observed in i3 as shown in FIG. 35, the index information displayed in j1 is displayed by the display control unit 211 as shown in FIG. 38. In this case, the image processing unit 208 performs 1.5 fold expansion laterally in this embodiment. When the viewer is observed in i1 as shown in FIG. 36, the index information displayed in j1 is processed by the image processing unit 208 and displayed by the display control unit 211 as shown in FIG. 39. In this case, the image processing unit 208 performs 2 fold elongation laterally in this embodiment. When the viewer is observed in i2 as shown in FIG. 37, the image processing unit 208 does not perform elongation processing, so that the index information is displayed as shown in FIG. 40.

Figure 41:
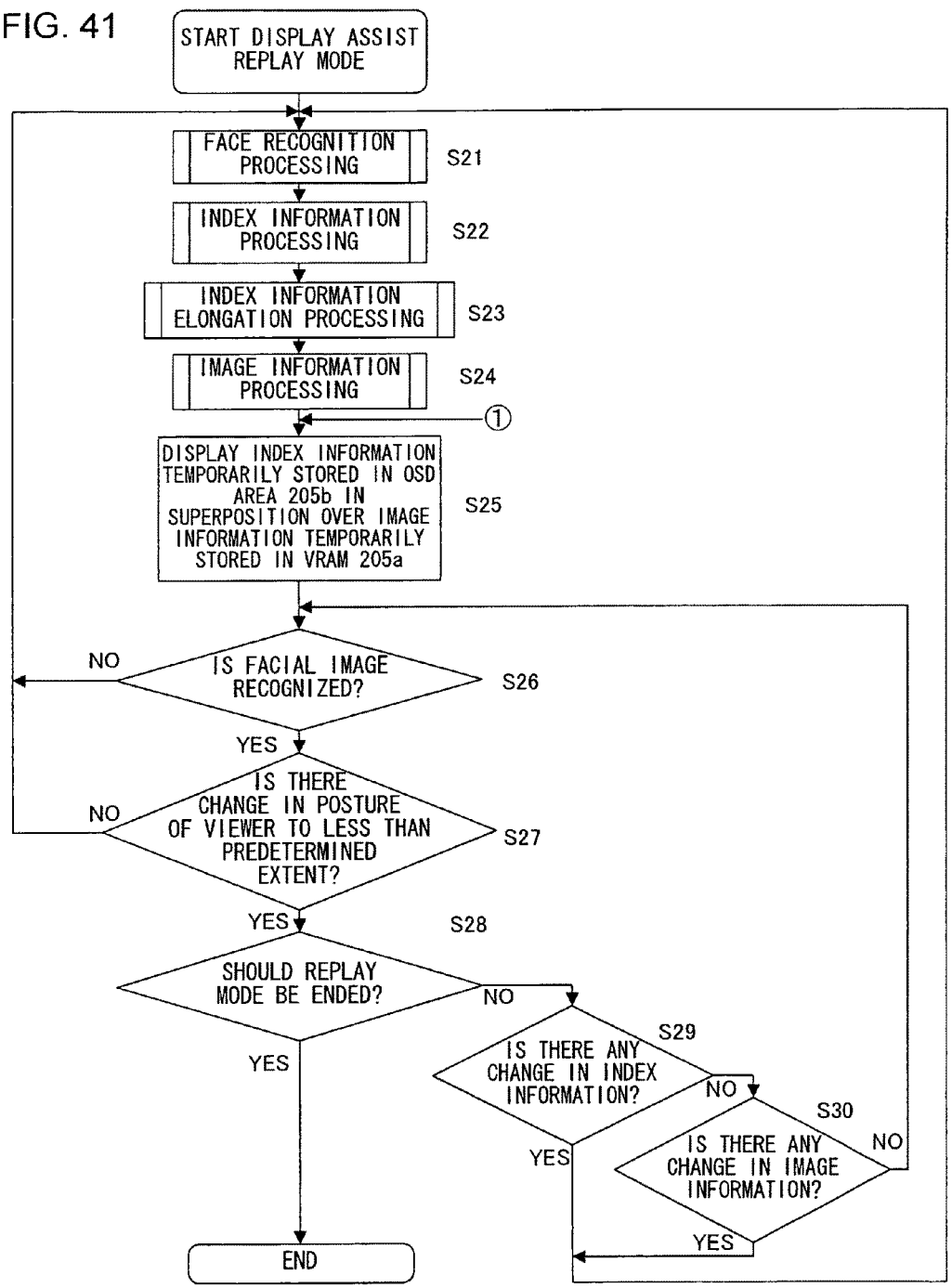
FIG. 41 is a flowchart of the processing in the replay mode.

The processing of assisting display in the replay mode is now explained with reference to the flowchart presented in FIG. 41. In step S21, the image processing unit 208 performs processing for recognizing the facial image of the viewer. In step S22, the image processing unit 208 processes the index information according to the instruction from the CPU 210 and the control proceeds to step S23. In step S23, the image processing unit 208 performs elongation processing on the index information according to the instruction from the CPU 210 and the control proceeds to step S24. In step S24, the image processing unit 208 processes the index information according to the instruction from the CPU 210 and the control proceeds to step S25. In step S25, the display control unit 211 controls the image information and the index information such that the index information temporarily accumulated in the OSD area 205b is displayed in superposition over the image information temporarily accumulated in the VRAM 205a.

In step S26, image processing unit 208 determines whether the facial image of the viewer has been recognized. If no facial image has been recognized, the control shifts to step S21 and if a facial image has been recognized, the control proceeds to step S27. In step S27, if it is determined by the image processing unit 208 that the size of facial image or the inclination in the facial image of the viewer of an image-capturing plane or the position of facial image of the viewer has changed to at least a predetermined extent, the control shifts to step S21. If the change is to an extent below the predetermined extent, the control shifts to step S28. In step S28, the CPU 210 determines whether end of the replay mode has been instructed by the user. The control proceeds to step S29 when the end of the replay mode has not been instructed. In step S29, the CPU 210 determines whether the index information is to be changed. When it is determined that the index information has to be changed, the control shifts to step S12 and the index information processing is performed. The control shifts to step S30 when it is determined that the index information has not to be changed.

In step S30, the CPU 210 determines whether the replayed image has changed. When it is determined that the replay image has changed, the control shifts to step S21. The control shifts to step S26 when it is determined that the replay image has not changed. In step S28, the CPU 210 ends this processing when it is determined that end of the replay mode has been instructed by the user. Because steps other than the elongation of the index information are similar to those in the first embodiment, the elongation processing in this embodiment is described as follows.

8. Elongation Processing on Index Information

Figure 42:
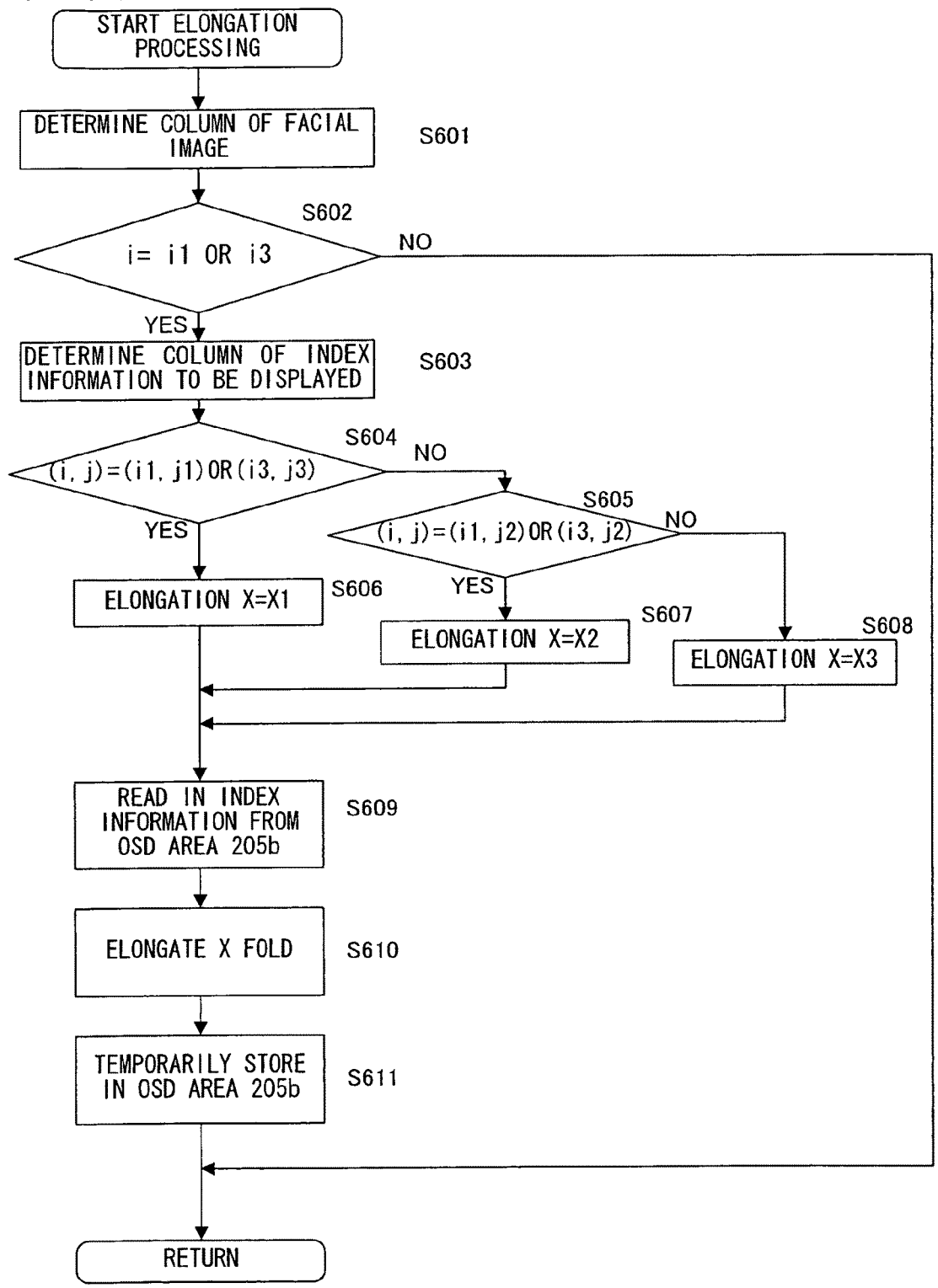
FIG. 42 is a flowchart that illustrates the elongation processing on the index information.

Details of the steps of elongation processing on the index information are described with reference to the flowchart presented in FIG. 42. In step S601, the image processing unit 208 determines a column "i" in which the facial image of the viewer exists and the process proceeds to step S602. When it is determined by the CPU 210 that i=i2 in step S602, the image processing unit 208 does not perform the elongation processing and the control returns to the main loop. On the other hand, the control proceeds to step S603 when it is determined by the CPU 210 that i=i2 is not established, and the CPU 210 determines a column "j" of the position of display of the index information based on information on position of display (hereafter referred to as "display position information") provided for the index information beforehand. Then, the control proceeds to step S604. In steps S604 and S605, the next step to be advanced is assigned as follows based on the combination (i,j) of the column of facial image of the viewer and the column of display position. In the case of (i,j)=(i1,j1) or (i3,j3), the control proceeds to step S606, and the CPU 210 sets the elongation rate X to X1. In the case of (i,j)=(i1,j2) or (i3,j2), the control proceeds to step S607, and the CPU 210 sets the elongation rate X to X2. In the case of (i,j)=(i1,j3) or (i3,j1), the control proceeds to step S608, and the CPU 210 the elongation rate X to sets X3. In this embodiment, it is assumed that X1 is 2 fold, X2 is 1.8 fold, and X3 is 1.5 fold. In step S609, the index information is read out by the CPU 210 from the OSD area 205b and the control proceeds to step S610. In step S610, the index information is elongated X fold by the image processing unit 208 and the control proceeds to step S611. In step S611, the processed index information is once accumulated in the OSD area 205b by the CPU 210 and the control returns to the main loop.

The processing of assisting display in the replay mode has been explained above. However, the effect of the improvement in visibility is also achieved in the shooting mode and the menu mode by inserting the processing step of elongation of the index information in the latter part of step S13 described in the first embodiment. In this embodiment, the image processing unit 208 has elongated only the index information. However, similar processing may be performed on the image information. In addition, the image-capturing area may be divided into three sub-areas in the vertical direction although it has been divided into three sub-areas in the lateral direction. When facial images of plural people are recognized, the image processing unit 208 performs elongation processing taking as a reference the position of a person who is nearest to the center point of the image-capturing area. When the facial image extends over plural sub-areas, the image processing unit 208 determines that the area in which the facial image exists is the sub-area that occupies the facial image in the largest ratio among the plural sub-areas. Similarly, when the index information extends over plural areas, the image processing unit 208 determines that the index information exists in the sub-area that occupies the index information in the largest ratio among the plural sub-areas.

According to the second embodiment as mentioned above, in addition to the advantages of the first embodiment, the following advantages can be obtained.

The image processing unit 208 is adapted to recognize the facial image of the viewer (observer) based on the image signal output from the image sensor 202, and performs elongation processing on the index information based on the position that the facial image occupies in the image-capturing area. That is, the image processing unit 208 is adapted to perform elongation processing on the index information displayed in an area remoter from the viewer on the LCD 105 at a higher elongation ratio than on the index information displayed in an area closer to the viewer on the LCD 105. As a result, the viewer can confirm the index information to which the distortion is reduced regardless of the position in which the viewer views the LCD 105, so that the visibility can be improved.

Third Embodiment

Figure 43:
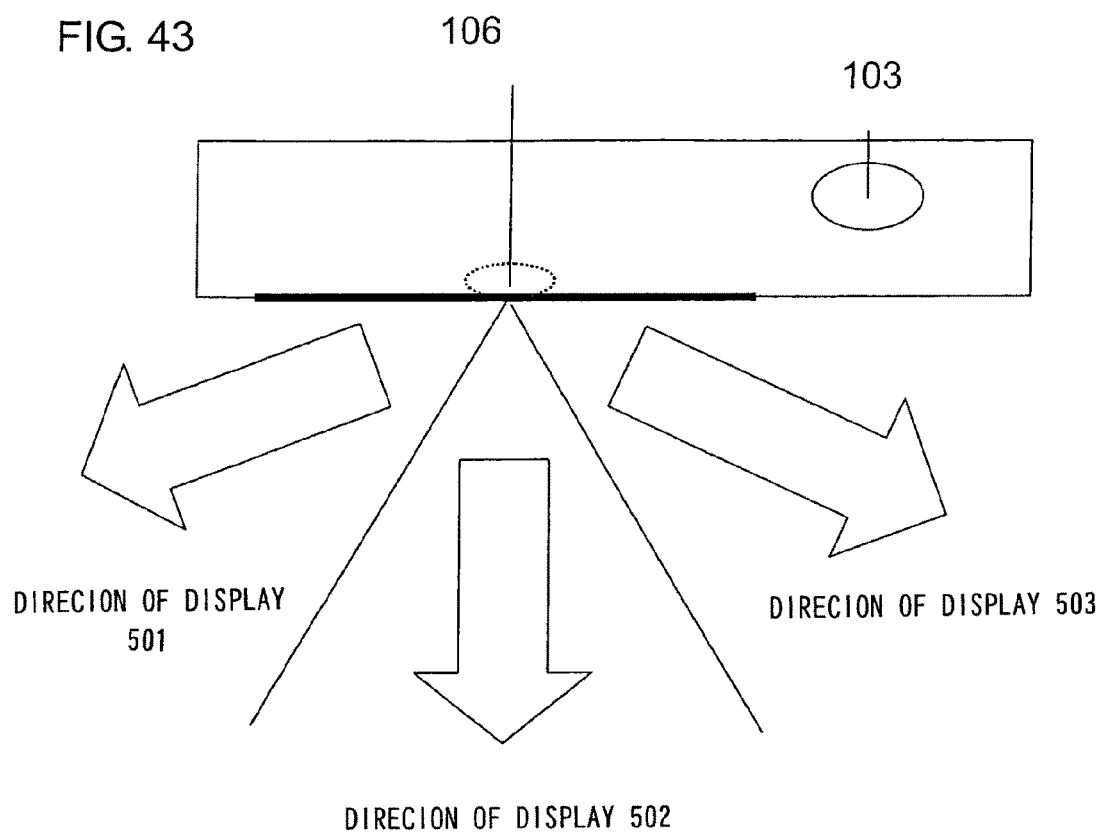
FIG. 43 is a diagram that illustrates an example of the displaying direction of an LCD that is capable of displaying in three directions.
Figure 44:
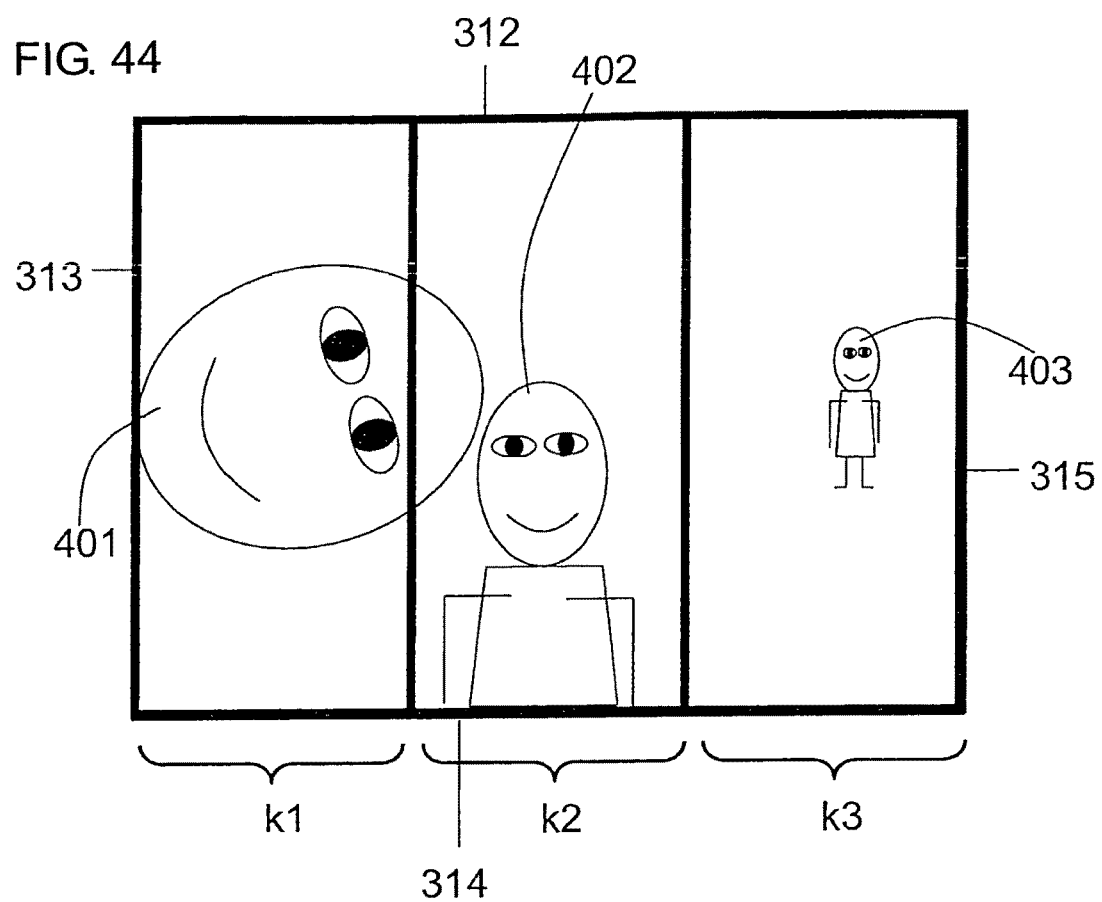
FIG. 44 is a diagram showing a position at which the facial image is captured.

In the first embodiment and the second embodiment, when plural facial images are recognized, the processing is performed based on the facial image of a person who is closest to the center point of the image-capturing area. On the other hand, an LCD that can display different pieces of information in three directions, respectively, is used as the LCD 105 as shown in FIG. 43 in the third embodiment. Moreover, this embodiment is executed with a lens with which an image can be captured within the range of θ of about 180° as shown in FIG. 4. FIG. 44 shows an area in which an image is captured by the image sensor 202 by using the photographic lens 106.

Figure 45:
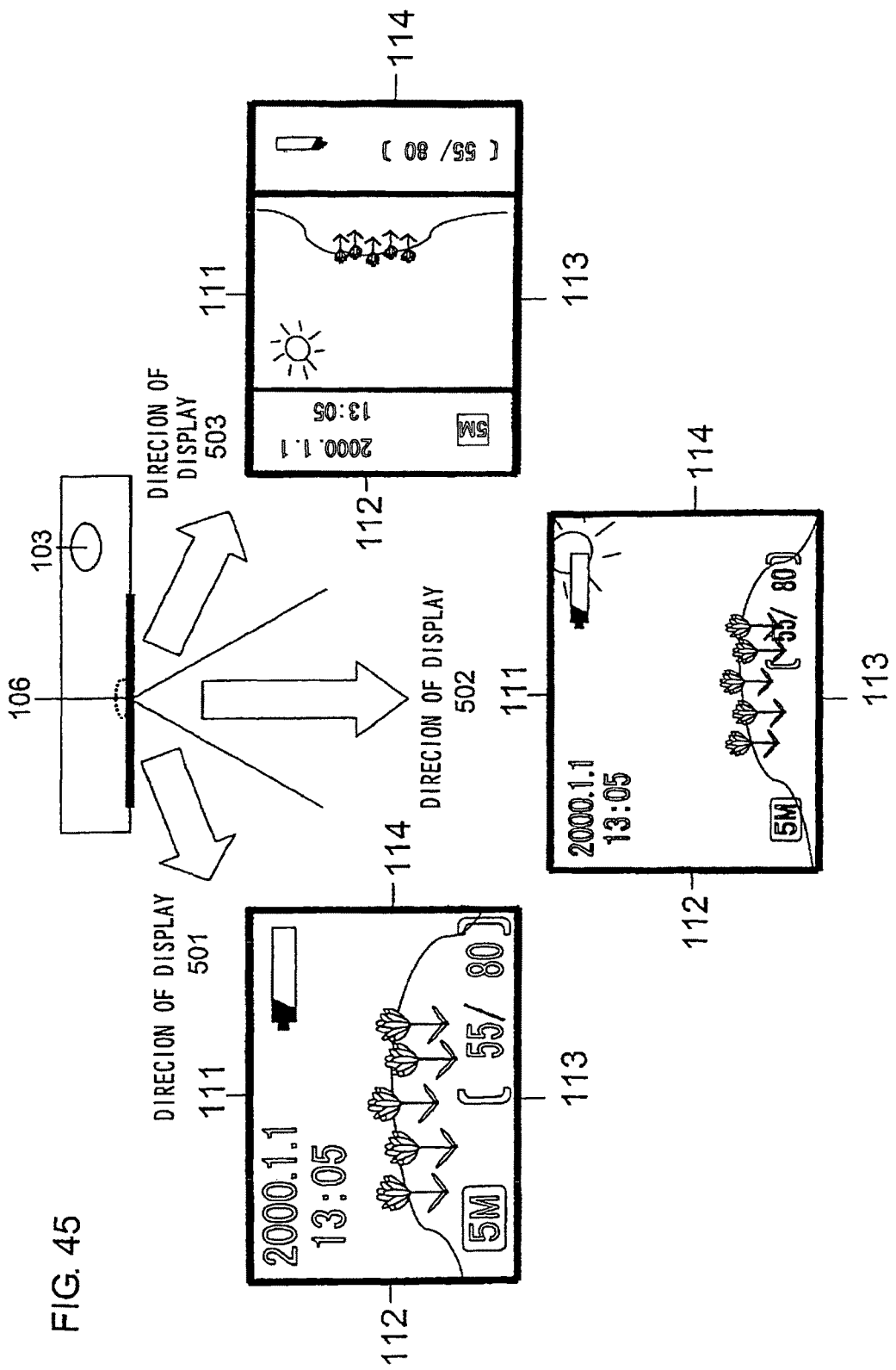
FIG. 45 is a diagram that illustrates an example in which different images are displayed on an LCD that is capable of displaying images in three directions.

The area in which an image is captured is divided into three sub-areas, i.e., area k1, area k2, and area k3, and the processing described in the first embodiment is performed based on the facial image of a person who is closest to the center point in each sub-area. When a single facial image extends over plural sub-areas, the image processing unit 208 determines that the area of the facial image exists in the sub-area in which there is a part of the facial image that occupies the facial image in the largest ratio. As shown in FIG. 44, the image processing unit 208 processes the index information and the image information based on the facial image 401 of the person who appears in the area k1. As a result, the display control unit 211 displays the index information and the image information in the display direction 503 on the display plane of the LCD 105. The image processing unit 208 processes the index information and the image information based on the facial image 402 of the person who appears in the area k2. As a result, the display control unit 211 displays the index information and the image information in the display direction 502. The image processing unit 208 processes the index information and the image information based on the facial image 403 of the person who appears in the area k3. As a result, the display control unit 211 displays the index information and the image information in the display direction 501. The appearance of display information displayed in each direction is as shown in FIG. 45. If there is an area where no facial image is detected, the display control unit 211 may turn OFF the display in a direction corresponding to that area. As a result, even if plural facial images are detected in plural sub-areas in the image-capturing area, that is, even if plural viewers look the LCD 105 from plural directions, the visibility of the index information and the image information to each viewer can be improved.

9. Supplementation

In the first embodiment, the image processing unit 208 has been explained to determine the direction based on the facial image when the directional information is imparted to the image information. However, the direction of the image may be determined based on other patterns as far as they are specified patterns that can presume the direction of the image. The direction may be determined based on, for instance, character pattern or color pattern etc. of the subject, or the direction may be estimated and determined from combinations of them.

In the first to the third embodiments, the image processing unit 208 determines the size of the facial image based on the ratio of the facial image area to the image-capturing area. However, other methods may be used to obtain the size of the facial image. In addition, the relationship between the size of the facial image and the rate of expansion is not limited to the values shown in this embodiment. Similarly, the relationship between the position and the elongation rate of the facial image is not limited to the values shown in this embodiment. The comparative values T1, T2, and T3 of the elapsed time shown by the face recognition processing are not limited to the values indicated in this embodiment.

Moreover, although the rate of expansion of the index information or the image information includes 3 stages, the rate of expansion may be set to be more continuous to change it smoothly. Moreover, although the scale of rotation angle of the index information or the image information includes 4 stages, the scale of rotation angle may be set to be more continuous to change it smoothly. Although individual rotation of the icon is shown as an example of the rotation of the index information, the layout that displays the index information may be rotated to change the display position. The same value is used for the magnification m of the index information and for the magnification m of the image information. However, different values may be used therefor.

In this embodiment, the expansion processing is performed on the image information using the center of the image information as a reference point. However, the present invention is not limited thereto and the center of the facial image in the image may be used as a reference point. In the above-mentioned embodiment, a method that employs expansion processing is used as a method of displaying the index information enlarged. However, a method may also be used in which icons and characters with different sizes are stored in the memory in advance and a piece of index information having a predetermined size may be selected for use from the icons or characters depending on the size of the facial image. When plural facial images were detected in the first embodiment and the second embodiment, the facial image of a person who is closest to the center point of the image-capturing area is assumed to be a facial image of a criterion for the determination. However, it may be assumed that the facial image of a viewer who is closest to a specific point other than the center point is used as a facial image of the criterion. Alternatively, the facial image of the criterion may be determined based on the size or inclination of the facial image.

Moreover, the same is true for the detection of the facial image in the image information and the facial image may be other than the one that is closest to the center point of the image information. Moreover, the same is true for the third embodiment and the facial image may be other than the one that is closest to the center point in each area. Moreover, although the processing is performed based on the size, inclination, and position of a single facial image, the processing may be performed based on an average size, an average inclination, and average position of plural facial images.

The image-capturing area in the third embodiment is divided into three sub-areas along the direction of the longer side of the image-capturing area. However, the image-capturing area may be divided into two sub-areas by using an LCD that can display different pieces of information in two directions. Moreover, the image-capturing area may be divided into four or more sub-areas by using an LCD that can display different pieces of information in more than four directions. Moreover, the display direction is divided in a plane vertical to the screen and parallel to the longer side of the screen. However, the display direction may be divided in a plane parallel to the shorter side of the screen.

Although the present invention is adopted to the digital camera that displays the image information and index information in superposition as mentioned above, the present invention may also be applied to an information displaying apparatus that displays only the image information or only the index information. In addition, the present invention has been described as using the image information and the index information. However, the present invention is not limited thereto and text information or sentence information may also be used as far as such is information of the kind that can be displayed on a display medium. That is, the present invention is not limited to the digital cameras according to the embodiments as far as the features and functions of the present invention are realized. For instance, the present invention is applicable to an information displaying apparatus equipped with a display medium constituted by a mobile phone, a PDA, a PC, an LCD such as a photo viewer or the like. In this case, the information displaying apparatus is assumed to be the one that includes the photographic lens 106 and image sensor 202 for photographing at least the viewer. The image processing unit 208 only has to perform various types of processing on the index information and the image information in the manner as mentioned above based on the inclination of the facial image, the size of the facial image, and the position at which the facial image occupies in the image-capturing area and so on detected by using the image signal output from the image sensor 202.

The above described embodiments are examples, and various modifications can be made without departing from the scope of the invention.

What is claimed is:

1. An information displaying apparatus, comprising:
   a body;
   a first image-capturing unit, disposed at the body, that captures a subject image and generates first image information;
   a memory control unit that stores information to a storage medium and outputs the information from the storage medium, the information including the first image information generated by the first image-capturing unit and index information that visually conveys an event and a content to an observer, the index information not being captured by the first image-capturing unit;
   a display, disposed to face the observer at the body, that displays the information output from the storage medium in a predetermined display form on a screen of the display;
   a second image-capturing unit, disposed to face the observer at the body, that captures an image of the observer in a state to observe the display and outputs an image signal;
   a facial image detection unit that detects a relative position at which a facial image corresponding to a face of the observer occupies an image-capturing area based on the image signal output from the second image-capturing unit, the image-capturing area including the facial image of the observer not being displayed on the screen of the display; and
   a display form change unit that changes the display form of the information to be displayed on the screen, wherein,
   the display form change unit changes the display form so that the information to be displayed on the screen is distorted based on the relative position at which the facial image occupies the image-capturing area detected by the facial image detection unit.

2. An information displaying apparatus according to claim 1, wherein,
   the index information comprises at least one of a character, a sign, a figure, and an icon.

3. An information displaying apparatus according to claim 1, further comprising:
   a mode switch unit that switches operation between a replay mode and another mode other than the replay mode; and
   a recognition unit that recognizes that there is a plurality of the facial images detected by the facial image detection unit, wherein
   if it is recognized by the recognition unit that there is a plurality of the facial images while the mode other than the replay mode is being executed, the mode switch unit switches the mode from the mode other than the replay mode to the replay mode.

4. An information displaying apparatus according to claim 1, wherein,
   the display form change unit includes a size change unit that changes a size of display of the information based on a size of the facial image detected by the facial image detection unit.

5. An information displaying apparatus according to claim 4, wherein,
   the size change unit performs expansion or reduction processing so that the smaller the size of the facial image, the larger the information is displayed.

6. An information displaying apparatus according to claim 4, wherein
   the size change unit comprises at least one of:
   a display size selection unit that selects a predetermined size of display from a plurality of sizes of display included in the information based on the facial image, and an expansion/reduction unit that expands/reduces, respectively, the information at a predetermined magnification depending on the size of the facial image.

7. An information displaying apparatus according to claim 6, further comprising:
a size determination unit that determines a size of the facial image detected by the facial image detection unit, wherein,
when it is determined that the size of the facial image is not less than a predetermined first threshold, the expansion/reduction unit expands or reduces the information at a predetermined magnification based on the first threshold, and
when it is determined that the size of the facial image is not more than a predetermined second threshold, the expansion/reduction unit expands or reduces the information at a predetermined magnification based on the second threshold.

8. An information displaying apparatus according to claim 1, wherein,
the display form change unit elongates the information if the position at which the facial image occupies the image-capturing area is outside a predetermined area.

9. An information displaying apparatus according to claim 8, wherein,
the display form change unit elongates the information displayed on the screen in an area remoter from the observer at a higher elongation ratio than the information displayed on the screen in an area closer to the observer.

10. An information displaying apparatus according to claim 1, further comprising:
a recognition unit that recognizes that there is a plurality of the facial images detected by the facial image detection unit, wherein,
when a plurality of the facial images has been recognized by the recognition unit, the display form change unit changes the display form based on a facial image closest to a predetermined point in the image-capturing area captured by the image-capturing unit.

11. An information displaying apparatus according to claim 1, wherein,
the display is adapted to be capable of displaying the information in a plurality of directions in different display forms, and
when the facial image detection unit detects a plurality of the facial images in a plurality of predetermined areas in the image-capturing area captured by the image-capturing unit, the display form change unit changes the display form based on a facial image in each area.

12. An information displaying apparatus according to claim 1, further comprising:
a power OFF unit that turns OFF power supply to a portion other than the facial image detection unit of the information displaying apparatus when no facial image is detected by the facial image detection unit for not less than a predetermined time.

13. An information displaying apparatus according to claim 12, further comprising:
a power ON unit that turns ON power supply when a facial image is detected within a predetermined time from a time at which the power supply to the portion other than the facial image detection unit of the information displaying apparatus is turned OFF by the power OFF unit.

14. An information displaying apparatus, comprising:
a body;
a first image-capturing unit, disposed at the body, that captures a subject image and generates first image information;
a memory control unit that stores first information and second information to a storage medium and outputs the first information and the second information from the storage medium, the first information including the first image information generated by the first image-capturing unit and the second information including index information that visually conveys an event and a content to an observer, the index information not being captured by the first image-capturing unit;
a display, disposed to face the observer at the body, that displays the first information and the second information output from the storage medium in predetermined display forms on a screen of the display;
a second image-capturing unit, disposed to face the observer at the body, that captures an image of the observer in a state to observe the display and outputs an image signal;
a facial image detection unit that detects a relative position at which a facial image corresponding to a face of the observer occupies an image-capturing area based on the image signal output from the second image-capturing unit, the image-capturing area including the facial image of the observer not being displayed on the screen of the display; and
a display form change unit that changes the display form of at least one of the first information and the second information to be displayed on the screen, wherein,
the display form change unit changes the display form so that at least one of the first information and the second information to be displayed on the screen is distorted based on the relative position at which the facial image occupies the image-capturing area detected by the facial image detection unit.

15. An information displaying apparatus, comprising:
a body;
a first image-capturing unit, disposed at the body, that captures a subject image and generates first image information;
a memory control unit that stores the first information and second information to a storage medium and outputs the first information and the second information from the storage medium, the first information including the first image information generated by the first image-capturing unit and the second information including index information that visually conveys an event and a content to an observer, the index information not being captured by the first image-capturing unit;
a display, disposed to face the observer at the body, that displays the first information and the second information output from the storage medium in predetermined display forms on a screen of the display;
a second image-capturing unit, disposed to face the observer at the body, that captures an image of the observer in a state to observe the display and outputs an image signal while the first and the second information displayed on the screen of the display;
a facial image detection unit that detects a relative position at which a facial image corresponding to a face of the observer occupies an image-capturing area based on the image signal output from the second image-capturing unit, the image-capturing area including the facial image of the observer not being displayed on the screen of the display; and a display form change unit that changes the display form of at least one of the first information and the second information to be displayed on the screen, wherein, the display form change unit changes the display form so that at least one of the first information and the second information to be displayed on the screen is distorted based on the relative position at which the facial image occupies the image-capturing area detected by the facial image detection unit.

* * * * *